(12) United States Patent
Varley et al.

(10) Patent No.: US 10,547,643 B2
(45) Date of Patent: Jan. 28, 2020

(54) SYSTEMS AND METHODS FOR DISTRIBUTED DATA SHARING WITH ASYNCHRONOUS THIRD-PARTY ATTESTATION

(71) Applicant: SecureKey Technologies Inc., Toronto (CA)

(72) Inventors: Michael Varley, Toronto (CA); Troy Jacob Ronda, Toronto (CA); Dmitry Barinov, Richmond Hill (CA); Gregory Howard Wolfond, Toronto (CA); Pierre Antoine Roberge, Toronto (CA)

(73) Assignee: SecureKey Technologies Inc., Toronto (CA)

( * ) Notice: Subject to any disclaimer, the term of this patent is extended or adjusted under 35 U.S.C. 154(b) by 162 days.

(21) Appl. No.: 15/443,400

(22) Filed: Feb. 27, 2017

(65) Prior Publication Data

US 2017/0251025 A1 Aug. 31, 2017

Related U.S. Application Data

(60) Provisional application No. 62/342,277, filed on May 27, 2016, provisional application No. 62/301,129, filed on Feb. 29, 2016.

(51) Int. Cl.
*H04L 9/32* (2006.01)
*H04L 29/06* (2006.01)
*H04L 9/08* (2006.01)

(52) U.S. Cl.
CPC .............. *H04L 63/20* (2013.01); *H04L 9/088* (2013.01); *H04L 9/0894* (2013.01); *H04L 9/321* (2013.01);
(Continued)

(58) Field of Classification Search
CPC ... H04L 63/20; H04L 63/126; H04L 63/0823; H04L 9/3247; H04L 63/1416;
(Continued)

(56) References Cited

U.S. PATENT DOCUMENTS 7,784,092 B2 8/2010 Pearson et al.
9,118,661 B1 8/2015 Juels et al.
(Continued)

FOREIGN PATENT DOCUMENTS

WO 2007135580 A2 11/2007
WO 2017/147692 A1 9/2017
WO 2017/147696 A1 9/2017

OTHER PUBLICATIONS

Document relating to U.S. Appl. No. 15/445,367, dated Oct. 23, 2018 (Notice of Allowance).
(Continued)

*Primary Examiner* — Trong H Nguyen
*Assistant Examiner* — Amie C. Lin
(74) *Attorney, Agent, or Firm* — BERESKIN & PARR LLP/S.E.N.C.R.L., s.r.l.

(57) ABSTRACT

Methods and systems for distributed data verification between a relying party server and a client device using data attested by at least one attestation server. Entities are loosely coupled, while still allowing for authentication data and transaction data to be tightly coupled in any given interaction. There need not be any prior relationships between relying parties and attestation servers, or between relying parties and users. A common syntax enables a relying party to define what types of attested data items will be accepted for a particular transaction, without having to predetermine all possible sources of identification a user may wish to provide. The relying party may not know the source of the
(Continued)

attested data items a priori, but can nevertheless determine if they are satisfactory once they are received.

44 Claims, 11 Drawing Sheets

(52) U.S. Cl.
CPC .......... *H04L 9/3236* (2013.01); *H04L 9/3247* (2013.01); *H04L 63/061* (2013.01); *H04L 63/0823* (2013.01); *H04L 63/126* (2013.01); *H04L 63/1416* (2013.01); *H04L 2209/38* (2013.01); *H04L 2209/60* (2013.01)

(58) Field of Classification Search
CPC ..... H04L 63/061; H04L 9/088; H04L 9/3236; H04L 9/321; H04L 9/0894; H04L 2209/60; H04L 2209/38
See application file for complete search history.

(56) References Cited

U.S. PATENT DOCUMENTS

| | | | |
|---|---|---|---|
| 9,215,223 | B2 | 12/2015 | Kirsch |
| 9,854,001 | B1* | 12/2017 | Roth ................. H04L 63/20 |
| 2004/0128546 | A1* | 7/2004 | Blakley, III ........ G06F 21/6245 726/8 |
| 2004/0153560 | A1 | 8/2004 | Masuhiro et al. |
| 2006/0021019 | A1* | 1/2006 | Hinton .................... G06F 21/41 726/10 |
| 2008/0022085 | A1 | 1/2008 | Hiltgen |
| 2009/0235345 | A1 | 9/2009 | Oikawa et al. |
| 2010/0088519 | A1 | 4/2010 | Tsuruoka et al. |
| 2010/0131973 | A1 | 5/2010 | Dillon et al. |
| 2013/0318576 | A1 | 11/2013 | Prakash et al. |
| 2014/0196037 | A1 | 7/2014 | Gopalan |
| 2014/0289117 | A1* | 9/2014 | Baghdasaryan ....... G06Q 20/42 705/44 |
| 2014/0289833 | A1* | 9/2014 | Briceno ................. H04L 63/08 726/7 |
| 2015/0288694 | A1 | 10/2015 | Liebl, III et al. |
| 2015/0332395 | A1 | 11/2015 | Walker et al. |
| 2015/0350198 | A1 | 12/2015 | Li et al. |
| 2015/0381602 | A1* | 12/2015 | Grim ..................... H04L 63/08 726/4 |
| 2016/0119343 | A1 | 4/2016 | Salmela et al. |
| 2016/0253622 | A1 | 9/2016 | Sriram et al. |
| 2017/0250972 | A1 | 8/2017 | Ronda et al. |

OTHER PUBLICATIONS

Joseph C. Guagliardo and Brittany Birnbaum, "Blockchain: Preparing for Disruption Like It's the '90s", Law360, Mar. 14, 2016, New York, USA. Available: https://www.law360.com/articles/771200/blockchain-preparing-for-disruption-like-it-s-the-90s.

Thomas Harning, "Bitcoin Deterministic Key Generation", Blog for the Electrum for Android—Native Edition Project, Jul. 10, 2013, Available: http://e4a-ne.blogspot.com/2013/07/bitcoin-deterministic-key-generation.html.

Don Johnson, Alfred Menezes, and Scott Vanstone, "The Elliptic Curve Digital Signature Algorithm (ECDSA)", 2001, Certicom Corporation, Canada, Available: https://doi.org/10.1007/s102070100002.

Peter Wuille, "BIP0032: Hierarchical Deterministic Wallets", Feb. 11, 2012, Bitcoin Wiki, Available: https://github.com/bitcoin/bips/blob/master/bip-0032.mediawiki.

Michael B. Jones, "RFC7518: JSON Web Algorithms (JWA)", Internet Engineering Task Force (IETF), May 2015, ISSN: 2070-1721, Microsoft, USA.

Michael B. Jones, "RFC7517: JSON Web Key (JWK)", Internet Engineering Task Force (IETF), May 2015, ISSN: 2070-1721, Microsoft, USA.

Bitcoin Wiki, "Protocol Documentation", Accessed: Feb. 11, 2016, Available: https://en.bitcoin.it/wiki/Protocol_documentation.

Marek Palatinus and Pavol Rusnak, "BIP0043: Purpose Field for Deterministic Wallets", Bitcoin Wiki, Apr. 24, 2014, Available: https://github.com/bitcoin/bips/blob/master/bip-0043.mediawiki.

Justus Ranvier, "BIP0047: Reusable Payment Codes for Hierarchical Deterministic Wallets", Bitcoin Wiki, Apr. 24, 2015, Available: https://github.com/bitcoin/bips/blob/master/bip-0047.mediawiki.

Bitcoin Wiki, "Secp256k1" Accessed: Feb. 11, 2016, Available: https://en.bitcoin.it/wiki/Secp256k1.

Wikipedia, "Shamir's Secret Sharing", Accessed: Feb. 11, 2016, Available: https://en.wikipedia.org/wiki/Shamir's_Secret_Sharing.

Russell Housley, "RFC5084: Using AES-CCM and AES-GCM Authenticated Encryption in the Cryptographic Message Syntax (CMS)", Nov. 2007, Internet Engineering Task Force (IETF), Nov. 2007, Available: https://tools.ietf.org/html/rfc5084.

Documents relating to International Application No. PCT/CA2017/050252. Mail Date: Apr. 13, 2017 (International Search Report and Written Opinion).

Documents relating to International Application No. PCT.CA2017/050263, Mail Date: May 12, 2017 (International Search Report and Written Opinion).

Extended European Search Report, dated Sep. 23, 2019, European Application No. 17759035.3, 9 pages.

Khovratovich et al., "Sovrin: identities in the blockchain era", Jun. 15, 2015, XP055572035, Retrieved from the Internet: URL: https://sovrin.org/wp-content/uploads/AnonCred-RWC.pdf [retrieved on Mar. 20, 2019], 5 pages.

Hardjono et al., "Anonymous Identities for Permissioned Blockchains", Jan. 24, 2016, pp. 1-16, XP055451013, Retrieved from the Internet: URL: http://www.the-blockchain.com/docs/MIT -ChainAnchor-DRAFT.pdf [retrieved on Feb. 14, 2018].

Melara et al., "Bringing Deployable Key Transparency to End Users", International Assocation for Cryptologic Research, vol. 20150404:205019, Apr. 4, 2015, pp. 1-16, XP061017986, [retrieved on Apr. 4, 2015].

Greenspan, "MultiChain Private Blockchain—White Paper", Jul. 24, 2015, XP055588977, Retrieved from the Internet: URL: http://web.archive.org/web/20150724003212if_/http://www.multichain.com/download/MultiChain-White-Paper.pdf [retrieved on May 15, 2019], 17 pages.

Extended European Search Report, dated Oct. 15, 2019, European Application No. 17759031.2, 7 pages.

* cited by examiner

SYSTEMS AND METHODS FOR DISTRIBUTED DATA SHARING WITH ASYNCHRONOUS THIRD-PARTY ATTESTATION

CROSS-REFERENCE TO RELATED APPLICATIONS

This application claims the benefit of U.S. provisional patent application No. 62/342,277, filed May 27, 2016, and U.S. provisional patent application No. 62/301,129, filed Feb. 29, 2016. The entire content of U.S. provisional patent application No. 62/342,277 is incorporated herein by reference.

FIELD

The described embodiments relate to data sharing in electronic systems and, in particular, to data sharing of identity attributes with attestation by third-parties in a networked environment such as the Internet.

BACKGROUND

Many identity verification systems use a broker-based model, which employs a broker to facilitate end-user identification. For example, one federated model used on the Internet allows a user to identify to a relying party by leveraging existing data from a preferred identity provider. The traditional deployment model uses a centralized broker to act as the interface between identity providers and relying parties.

However, existing broker-based models suffer from a number of drawbacks. For example, each identity provider and relying party may have its own infrastructure and workflow for the generation and provision of data to and for users. These workflows and infrastructure may lack compatibility between parties, requiring costly and difficult integration and testing to enable additional identity providers and relying parties to interoperate.

In addition, existing models rely upon the continued and active participation of identity providers, meaning that service outages or the decommissioning of identity provider services can result in the inability to use a source of identification. Existing models do not easily allow for users to mix-and-match identification attributes from multiple identity providers, limiting their usefulness in many situations. Furthermore, existing models can require disclosure to the broker of the sensitive data (such as address) that is being used for identification. These and other drawbacks highlight the need for improved methods and systems for electronic identity provision and verification.

SUMMARY

In a broad aspect, there is provided a method of distributed data verification between a relying party server and a client device using data attested by at least one attestation server, the method comprising: receiving a relying party request from a relying party server, the relying party request comprising a relying party profile identifier, an attested data item request, and a relying party proof that enables verification of the relying party request; verifying the relying party request based on the relying party proof, wherein verification of the relying party profile comprises: retrieving a relying party profile based on the relying party profile identifier, extracting a verification component from the relying party profile; verifying the relying party proof using the verification component; when verification of the relying party request is successful: determining whether an attested data item can fulfill the attested data item request; when the attested data item request can be fulfilled, retrieving the attested data item and an attestation corresponding to the attested data item, wherein the attestation comprises a cryptographically-generated proof that the attested data item was verified by the at least one attestation server; generating a response, the response comprising the attested data item and the attestation; and transmitting the response to the relying party server.

In some cases, the response comprises at least one additional attested data item and at least one additional attestation corresponding to each at least one additional data item, the method further comprising, prior to generating the response: determining that the at least one additional attested data item can fulfill the attested data item request; retrieving the at least one additional attested data item and the at least one additional attestation.

In some cases, methods further comprise: determining that the at least one additional attested data item is not initially available; transmitting a request for the at least one additional attested data item to at least one attestation server; receiving a response to the request from the at least one attestation server, the response comprising the at least one additional attested data item and the at least one additional attestation; and storing the at least one additional attested data item and the at least one additional attestation in a data store.

In some cases, the at least one attestation server comprises at least a first attestation server and a second attestation server, and wherein the attested data item is received from the first attestation server, and wherein the at least one additional attested data item is received from the second attestation server.

In some cases, the attestation further comprises a cryptographically-generated client proof that the attested data item was verified by the client device, and generating the response further comprises: retrieving a client device cryptographic key; and verifying the attested data item using the cryptographically-generated client proof.

In some cases, methods further comprise, prior to generating the response, determining whether the attested data item is eligible to be released.

In some cases, the determining whether the attested data item is eligible to be released is based on a user agent policy.

In some cases, determining whether the attested data item is available comprises searching for the attested data item in a data store.

In some cases, methods further comprise: determining that the attested data item is not initially available; transmitting a request for the attested data item to at least one attestation server; receiving a response to the request from the at least attestation server, the response comprising the attested data item and the attestation; and storing the attested data item and the attestation in a data store.

In some cases, the relying party request comprises a processing agent identifier, the method further comprising: determining a processing agent associated with the processing agent identifier; providing the response to the client device; and providing an indication of the processing agent to the client device to enable the client device to forward the response to the processing agent.

In some cases, the relying party profile identifier identifies a network location of the relying party profile.

In some cases, the relying party request comprises an identity attribute associated with the relying party profile.

In some cases, the relying party request comprises an identity attribute verification value associated with the identity attribute associated with the relying party profile.

In some cases, the relying party request comprises a plurality of identity attributes and a plurality of identity attribute verification values associated respectively with the plurality of identity attributes.

In some cases, the relying party request comprises an extensible data identifier.

In some cases, the relying party request comprises an identification of at least one attestation server.

In some cases, methods further comprise, prior to generating the response, authenticating a user of the client device.

In some cases, the authentication is performed via the client device.

In some cases, the authentication is performed via an authentication server.

In some cases, methods further comprise: receiving a second relying party request from a second relying party server; verifying the relying party request; determining that the attested data item can fulfill the second relying party request; retrieving the attested data item and the attestation corresponding to the attested data item; generating a second response, the second response comprising the attested data item and the attestation; and transmitting the response to the second relying party server.

In some cases, the relying party request comprises a policy identifier, the method further comprising retrieving at least one policy based on the policy identifier, wherein determining whether the attested data item can fulfill the attested data item request is based on the at least one policy.

In some cases, the relying party request further comprises a non-attested data item request, and wherein the response comprises a non-attested data item, the method further comprising generating the non-attested data item.

In another broad aspect, there is provided a method of distributed data verification between a relying party server and a client device using data attested by at least one attestation server, the method comprising: determining a relying party profile identifier and an attested data item to be requested; generating a relying party request, the relying party request comprising the relying party profile identifier, the attested data item request, and a relying party proof that enables verification of the relying party request; transmitting the relying party request from a relying party server; receiving a response to the relying party request from a client device, the response comprising a attested data item corresponding to the attested data item request, and an attestation corresponding to the attested data item, wherein the attestation comprises a cryptographically-generated proof that the attested data item was verified by at least one attestation server.

In some cases, the response comprises at least one additional attested data item and at least one additional attestation corresponding to each at least one additional data item.

In some cases, the at least one attestation server comprises at least a first attestation server and a second attestation server, and wherein the attestation is generated by the first attestation server, and wherein the at least one additional attestation is generated by the second attestation server.

In some cases, the attestation further comprises a cryptographically-generated client proof that the attested data item was verified by the client device.

In some cases, the relying party request comprises a processing agent identifier In some cases, the relying party profile identifier identifies a network location of the relying party profile.

In some cases, the relying party request comprises an identity attribute associated with the relying party profile.

In some cases, the relying party request comprises an identity attribute verification value associated with the identity attribute associated with the relying party profile.

In some cases, the relying party request comprises a plurality of identity attributes and a plurality of identity attribute verification values associated respectively with the plurality of identity attributes.

In some cases, the relying party request comprises an extensible data identifier.

In some cases, the relying party request comprises a policy identifier.

In some cases, the relying party request further comprises a non-attested data item request, and wherein the response comprises a non-attested data item, the method further comprising generating the non-attested data item.

In another broad aspect, there is provided a non-transitory computer readable medium storing computer executable instructions which, when executed by a computer processor, cause the computer processor to carry out methods of distributed data verification between a relying party server and a client device using data attested by at least one attestation server.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
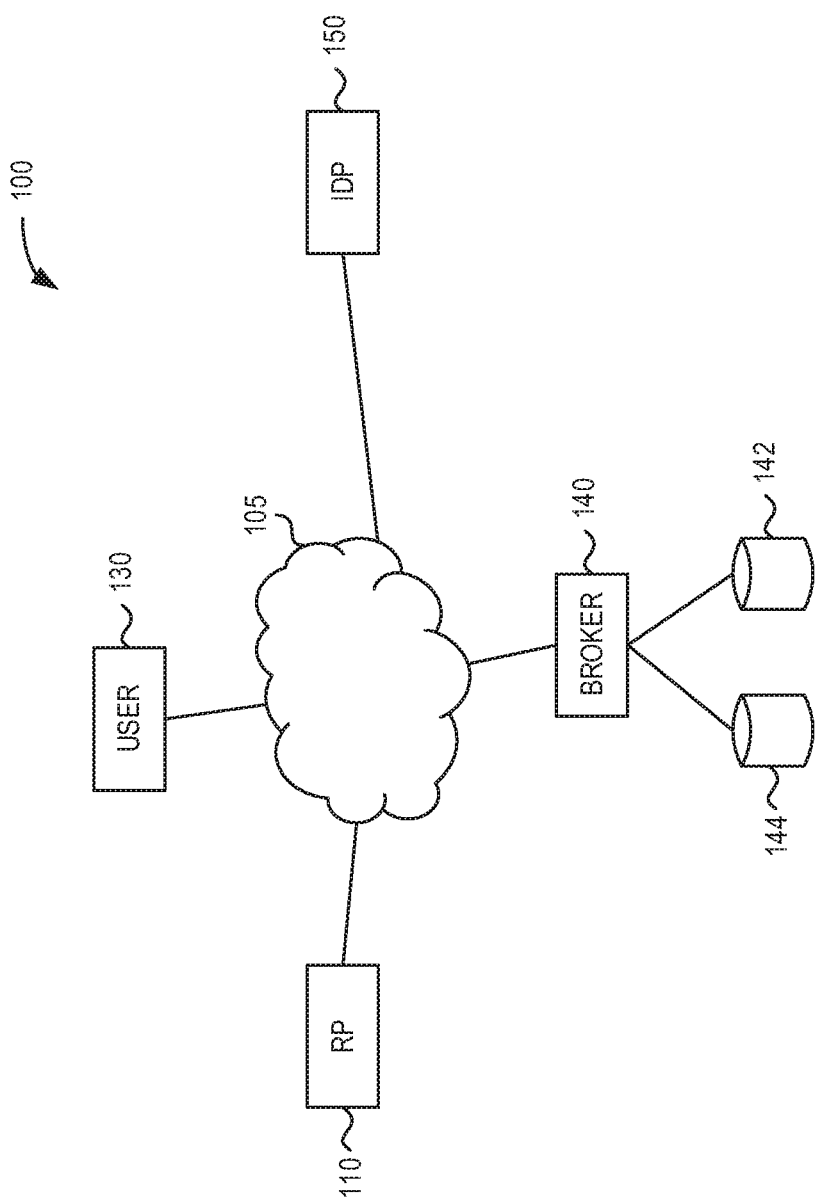
FIG. 1 is a schematic block diagram of a traditional broker-based authentication system according to the prior art.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

It should also be noted that there may be some elements that are used to implement at least part of one of the embodiments described herein that may be implemented via software that is written in a high-level computer programming language such as one that employs an object oriented paradigm. Accordingly, the program code may be written in Java, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The concept of electronic identity proofing generally is that of verifying some identity claim of a user by way of a third-party. Conventionally, identity proofing involves a Relying Party (RP) querying the source of an identity claim—an Identity Provider (IdP)—either directly, or by using an aggregator service to supply identity assurances. In both cases, the RP is interfaced directly to its integrated partners. This can be expensive, and dramatically limits the number and types of available IdPs that can be used by any given RP. For example, if a RP wishes to accept a driver's license as proof of identity, it must integrate with the department of motor vehicles in individual jurisdictions, or else rely on an aggregator service to do so. The more driver's license types that the RP would like to process, the more expensive the integration costs. Driver's licenses issued by any jurisdiction whose department of motor vehicles has not integrated system with the RP will not be available for identity proofing with the RP. Moreover, the level of difficulty of meeting the requirements to integrate with RPs limits the types of IdPs, and prevents parties with fewer resources from providing their own attested data. For example, an individual (Bob) may wish to attest data items for another individual (Alice) for use with a RP.

Currently, Federated Identity Management (FIM) or Federated Access Management (FAM) systems are used to decouple authentication services from identity-based services. That is, authenticating a digital credential is one problem, and providing data or digital services is another. Therefore, there may be little assurance that the individual authenticating is actually the individual using the service, because the authentication system data and resource data are completely decoupled.

However, some key issues facing online services today are the problems of identity in two key areas: 1) how does the service collect valid and relevant information that may be necessary to provide a service to the user, and 2) how does the service know for certain the owner of the information is the same individual interacting with the service?

One example is a government-run benefits program: the government authority would prefer to issue benefits electronically, rather than physically in person at a bricks-and-mortar office, for convenience and cost savings. To do so, the government authority should first verify that the user who is attempting to claim a benefit is indeed qualified to receive that benefit; conventionally, this can be done by requesting and examining a variety of documentation the person possesses. Secondly, the government authority wishes to authenticate that the individual collecting the benefits matches the individual they are claiming to be in the application; conventionally, this is usually accomplished by an agent by matching a photo on an official document to the individual physically in the presence of the agent, or by collecting notarized statements that support the identity claims. In order for services to implement more efficient electronic processes, the above actions must be reproducible digitally.

In another example, a car rental agency may wish to allow customers to rent a vehicle without interacting with a desk agent. Conventionally, the driver must present a valid driver's license to the desk agent for the agent to verify that the driver's license photo matches the individual present. An electronic system should replicate the same steps, for example, using real-time facial recognition.

This issue is not limited to online services. In-person identity verification is currently accomplished by having an individual present official documentation for an agent to verify. These documents often include more information than is required by the agent for a particular purpose. For example, if the agent only requires majority age verification and a photo, a driver's license exposes additional information such as home address and an exact birth date. For privacy reasons and the protection of both parties, it would be preferable to present the agent with a tailored credential that contains only the majority age verification claim (e.g., over age 21) and a photo for in-person verification.

Identity proofing is further complicated by the fact that individuals often have a range of identity credentials which may be acceptable for a given purpose. For instance, government photo identification can include a passport, driver's license, or a state-issued ID card. In some cases, proof of residence can be provided using a bill from a telecommunications company, a utilities company, the post office, and so on.

The described embodiments provide for identity proofing services (both online and in-person) to request only the particular information they require and are entitled to receive. Likewise, users can review such requests and determine what to share.

In some embodiments, a common syntax can be provided to enable online services (and in-person agents) to electronically request distinct, verifiable and relevant identity claims and other data (collectively referred to herein as "attested data items") from the user. At the same time, the common syntax can also facilitate verification of the source of these attested data items, so that their trustworthiness can be evaluated.

In some embodiments, real-time verification can be used to ensure that a trusted authentication source is linked to the attested data items being presented.

Accordingly, the described systems and methods can tightly couple authentication to the source of the identity data. For instance, if a user is claiming possession of a bank account, they may be required to log into that bank account online in real-time, or to have done so in the past. If a user is claiming the privilege to drive a car by presenting a driver's license, they may be subjected to facial matching to the driver's license photo. Many other examples are possible.

In addition to the above, the described embodiments can provide end users with control of their online and real-world identity, while maintaining confidence in the protection of their data by third party providers.

The described embodiments also allow identity providers with the ability to "mint" digital identity attributes, a type of attested data item, while freeing the identity providers from costly integration and data sharing agreements with individual relying parties.

Using the described embodiments, a user can elect to share one or more attested data items with one or more RPs. The RP can be an individual with an electronic device, or an online electronic service. The attested data items need not originate at one source in order to be shared together in a single transaction. For example, a user can provide an attested data item indicating membership in a club along with a driver's license in the same transaction. Although the attested data items may originate with different attestation servers (such as IdPs), those attestation servers need not have any interrelationship, nor any relation to the RP requesting such information.

In some cases, the attested data item may be attested by the user directly. In particular, the user may cryptographically attest to carry out some future action, e.g., conditional on some other event, as described further herein.

Existing Systems

As noted above, in the field of online federated authentication systems, the traditional broker deployment model provides centralized authentication or identity services from a set of identity providers to a set of relying parties. One example of a broker service is the SecureKey Concierge™ service, which is a privacy enhancing web-based system that allows a user to authenticate or provide data claims that originate from their preferred identity provider to other relying parties. This broker service acts as a centralized service that all participants trust to maintain privacy, audit records and supply reports for billing purposes. To enhance privacy, the broker service can mitigate user tracking, for example, hiding from identity providers the websites that users are visiting.

Referring now to FIG. 1, there is illustrated a schematic block diagram of a traditional broker-based authentication system according to the prior art. Broker-based system 100 has a broker server 140, which communicates with a relying party server 110 and an identity provider server 150 via a data communication network 105, such as the Internet. Both relying party server 110 and identity provider server 150 communicate with a user device 130, also via data communication network 105. Broker server 140 maintains a user identifier mapping database 144 and an audit database 142, which stores audit log information for transactions handled by broker server 140. User identifier mapping database 144 contains a mapping of user identifiers used by each relying party server 110 and identity provider server 150, which enables broker server 140 to use different user identifiers (i.e., for the same user) with different relying party servers 110 or identity provider servers 150.

Figure 2:
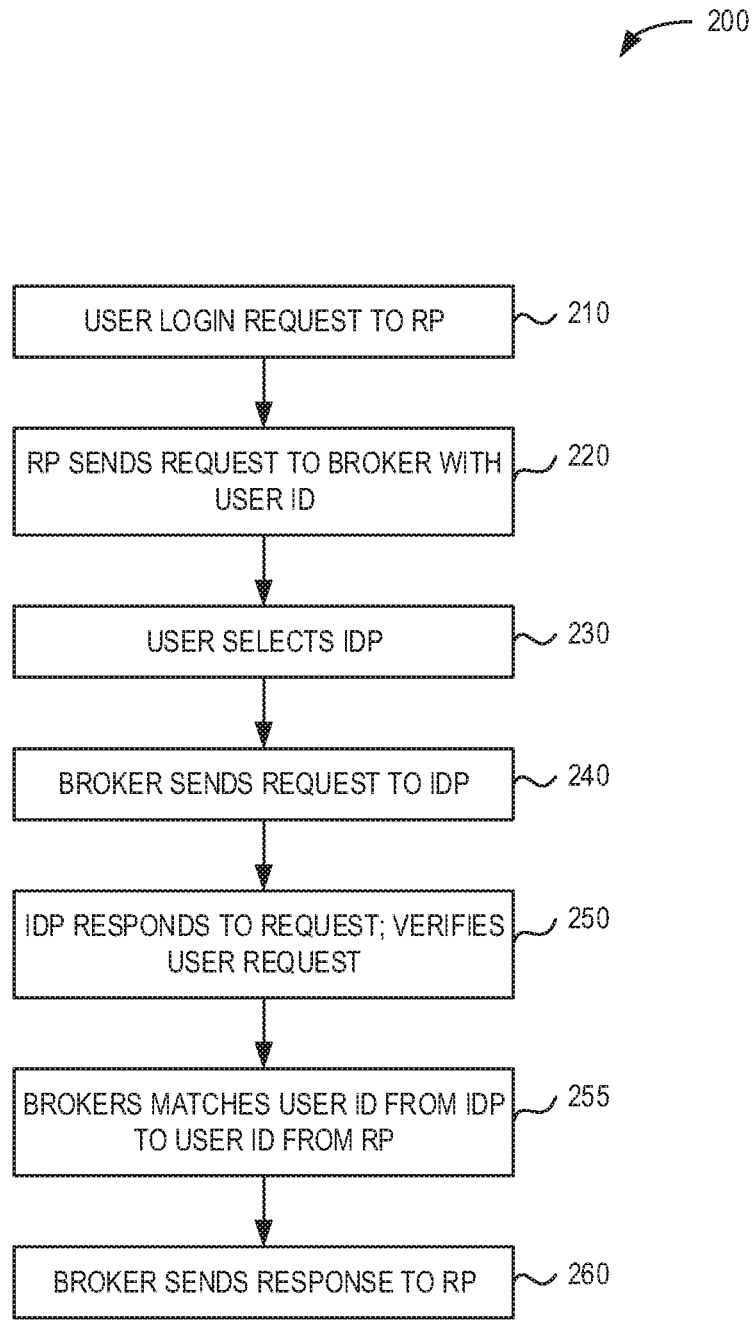
FIG. 2 is a simplified process flow diagram for the broker-based authentication system of FIG. 1.

Referring now to FIG. 2, there is illustrated a simplified process flow diagram for the broker-based authentication system of FIG. 1, according to the prior art.

Flow 200 begins at 210 with a user device 130 requesting to authenticate with relying party server 110. At 220, the relying party server 110 sends a request to the broker server 140 containing the user identifier supplied to the relying party server 110.

At 230, the user selects an identity provider server. The selection may be made by referring the user device 130 to broker server 140 and by providing a list of possible identity providers.

At 240, broker server 140 sends a request to the identity provider server 150 associated with the selection made at 230. Identity provider server 150 authenticates the user device 130, for example by issuing a challenge to user device 130, or by verifying a token or credential supplied in the original request by user device 130.

If the authentication is successful, identity provider server 150 responds to indicate successful authentication at 250, and may also include one or more requested data item. For example, if identity provider server 150 is operated by a bank, the requested data item may be a user's mailing address, which has been previously verified by the bank.

At 255, broker server 140 identifies a user record associated with the IdP supplied user identifier and determines a corresponding RP user identifier to be used with the relying party 110, using user identifier mapping database 144.

At 260, broker server 140 receives the response and forwards the data to the relying party server 110.

According to flow 200, the relying party server requests authentication and data from the broker server. The identity provider server must be available to authenticate the user and provide data back to the broker server, which can then send the data to the relying party server. Transaction and user identifier records are kept by the broker server.

Broker-based system 100 does not enable a single end user to demonstrate control and ownership of multiple identities from various identify providers in a single transaction.

In contrast with broker-based system 100, the described embodiments provide a number of useful features.

For example, a user may wish to identify to a relying party both as "John Smith with phone number 212-555-1212" and as "John A Smith with age greater than 21". The described embodiments allow an end user to collect attested data items from disparate sources (e.g., from multiple identity providers), while also maintaining the proof of origin and the validity of the data when presented to requesting relying party. Moreover, the described embodiments allow for users to make use of their attested data items as needed and without involving an identity provider. Identity information can be obtained asynchronously.

Generally, the described systems and methods enable a decentralized and asynchronous authentication flow between users, relying parties (RP) and attestation servers, by shifting functions previously performed by a broker server to a trusted user agent application under the user's control. In particular, the user agent application can handle the acceptance of RP requests and response with authentication and identity data, thereby obviating the need for the broker server to carry out these functions.

In the described embodiments, the attestation server is not necessarily required for each transaction. Instead, the user agent can share a previously issued and stored attested data items with an RP. In some embodiments, the attested data items can be an Identity Provider Data Bundle (e.g., a collection of one or more claims), or a subset thereof, as described in U.S. provisional patent application No. 62/301,129.

Identity Management System

Figure 3:
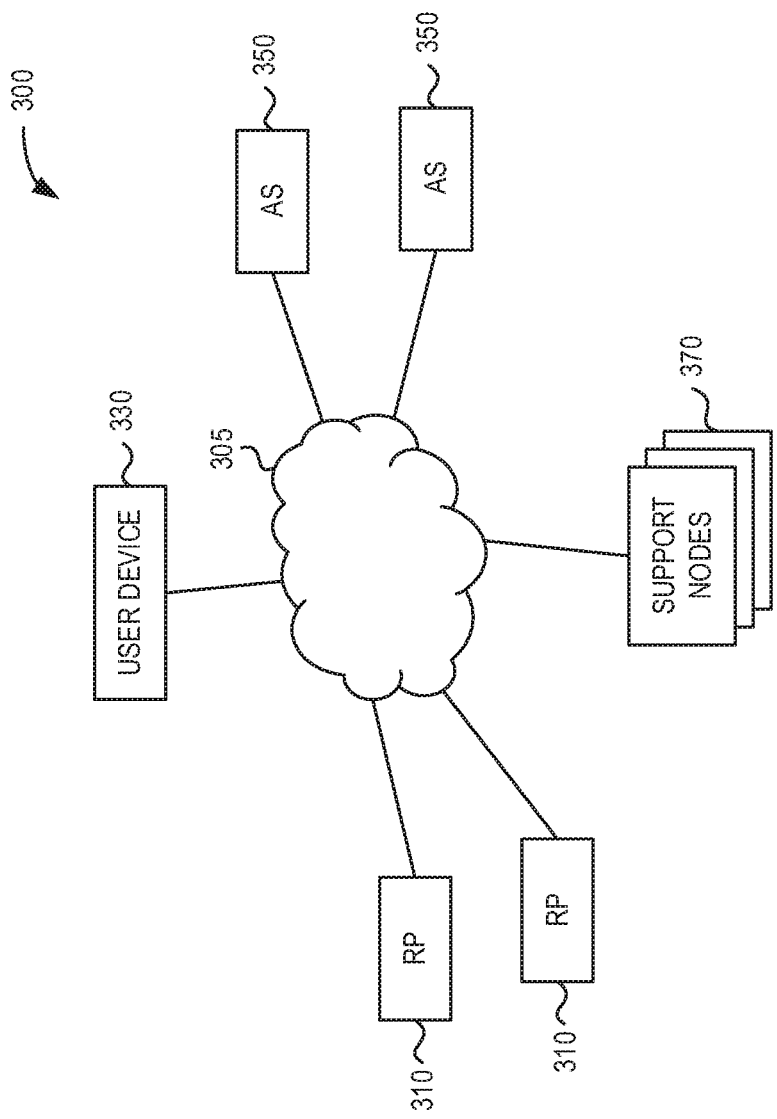
FIG. 3 is a schematic block diagram of an identity management system in accordance with at least some embodiments.

Referring now to FIG. 3, there is illustrated a schematic block diagram of an identity management system in accordance with at least some embodiments.

Identity management system 300 has many authentication and identity broker functions integrated into the user device 330, a subset of which may be referred to as a user agent server. Generally, the term user agent server refers to the user device 330 when a processor of the user device is executing a secure application, i.e., an application that causes the processor to implement the user agent server. In some embodiments, the user agent server may be a physically separate device, in which case user device 330 may cooperate and communicate with the physically separate device via a suitable data connection to carry out the functions described herein.

The user agent server locally authenticates a user at the user device 330 and manages consent procedures.

In some embodiments, however, the user agent server may be executed by a computer or server that is physically separate from the user device 330. In such cases, the user agent server will be in communication with a user agent that is executed by the user device 330, with the functionality of the user agent server divided accordingly.

User computing device 330 communicates with one or more relying party (RP) server 310 and one or more attestation server 350 via a data communication network 305, such as the Internet. In some embodiments, identity management system 300 may have one or more support nodes 370.

Attestation server 350 is generally provided or operated by an entity that can provide one or more attested data items, for example, because the user has some sort of pre-existing relationship with the entity. For example, the entity may be a financial institution or a government agency. In many cases, the entity will have procedures for the real-world verification of identity attributes, which means that identity attributes may have strong assurances when their origin is the Attestation server.

RP server 310 is a server that makes a request for attested data items as described herein. For example, RP server 310 may be operated or provided by a web service, such as an online social networking website, or an e-commerce website. In some cases, RP server 310 may be a user device possessed by another individual. Generally, RP server has a desire to obtain some attested data item from user device 330, or to have user device 330 prove that it has control over that attested data item.

Each server and computing device described herein generally has a processor, volatile memory and non-volatile storage memory, at least one network interface. Depending on its configuration, each server and computing device may have input devices such as a keyboard, trackpad or touchscreen, output devices such as a display and speakers, and various other input/output devices as will be appreciated.

Moreover, each server may be constructed from multiple devices, as in a server farm, which may be in geographically diverse locations, and accessed via a load balancer. Such arrangements are sometimes referred to as a "cloud" service. For example, relying party server 310 may be constructed of multiple edge node servers, which replicate and serve data in geographically diverse locations. The functionality described herein as provided by a particular server (e.g., relying party server 310) may be divided among multiple physical devices, which are then logically linked or merged from the third party perspective.

In some embodiments, the functionality of multiple servers may be combined into one server, whether via hardware virtualization or otherwise. For example, a single physical device may serve as both an attestation server 350 and a support node 370.

Identity management system 300 generally provides a decentralized and asynchronous authentication flow between participants, which is made possible by providing several authentication and identity functions in a trusted user agent server, which the user controls. As a result, Attestation servers are in some cases not required to be online during an identity transaction; that is, interactions between the user device 330 and attestation server 350 in some cases can be carried out asynchronously to those interactions between the user device 330 and RP server 310. In other cases, however, RP server 310 may require that an attestation server 350 is available to perform a real-time authentication, as described elsewhere herein.

As the attestation server is not necessarily involved during an identity transaction between user device 330 and RP server 310, one or more support node server 370 may be available to provide data in support of the identity transaction. Such data may include, for example, public keys or other public data, as described herein.

Such data can be held in databases or stores provided and managed by support node servers 370, which can also be used to provide notarization and integrity controls to the RP and other participants. Accordingly, support node servers 370 can ensure data integrity, including by identifying the data publisher of data, events and transactions that occur, while maintaining participant privacy.

In some cases, the support node servers 370 can be implemented as a network of peer verifiers. In such cases, the support node servers 370 may provide a public distributed data store which acts to publish cryptographic hash digests (hashes) for any system participant to review. This can be implemented using a blockchain paradigm.

Data communication network 305 is a network, such as the Internet, which can be constructed using various networking technologies and topologies. For example, portions of network 305 may be mobile data networks. Although shown as one monolithic network for ease of illustration, various elements of identity management system 300 may communicate via virtual private networks provisioned over network 305, or via private networks provisioned over dedicated links (not shown). Moreover, although not explicitly described in each case, communications between the various elements of system 300 generally involve session-level security, such as Transport Layer Security (TLS).

Although only one or two of each type of participant is shown, identity management system 300 can include one or more user devices 330, one or more RP servers 310, one or more attestation servers 350 and one or more support node servers 370. Each user device can be operated by an individual that has a relationship with one or more attestation server and may have multiple relationships, or no relationships, with relying party servers. In some cases, the attestation servers may be omitted for some purposes, although RP servers may decline a transaction if the user device response lacks an attestation. Identity management system 300 allows for there to be no explicit relationship between RP servers and attestation servers.

Thus, identity management system 300 provides a framework for the exchange of trusted digital identity documents and other data between parties. Trusted claims, such as identity data or identity credentials, and other attested data items, can originate from strong identity assurance processes performed by trusted attestation servers, such as financial institutions or government entities. However, other types of attested data items may originate with other sources. Users are able to safely collect attested data items and later share this data with RP servers. RP servers can leverage these attested data items for services or transactions as needed.

Moreover, RP servers are able to construct RP requests using syntax phrases, which user agent server 3390 are able to parse and use to perform further processing before providing a response. In some cases, RP requests may require that an attestation serve generate or provide a portion of the response message, in which case user agent server 3390 may communicate with the attestation server for this purpose.

In general, attested data items can be any type of data. One class of attested data items is identity attribute data that relates to a user that is in the possession of a third party, may have been verified by the third party, and which can be attested to by the third party. Identity attributes can include data such as: user identification information (e.g., name, age, citizenship, driver's license number, etc.); information about a user's property or assets (e.g., car license plate number, home address, etc.); items in the possession of a user (e.g., shareholder certificate, lottery ticket, fishing license or quota, warranties, etc.), education information (e.g., student enrollment status, student identifier, etc.), employment information (e.g., employer, employee ID, employee position, etc.), health information (e.g., medical records, insurance information, etc.), and many others.

In particular, identity management system 300 allows one or more user device 330 to request that one or more attestation server 350 "mint" an attested data item, which can be a digital identity document containing one or more identity attribute known to the attestation server and associated with the user. Under the control of user device 330, one or more attested data items can be shared with a RP server, thus giving the user the power of when and where their data is shared, while also freeing the attestation servers from costly and difficult point-to-point integration and data sharing agreements with every RP server with which users may wish to interact. The distributed approach is private and secure, and has no central point of data collection that can be used to simultaneously attack all users or participants.

Figure 4:
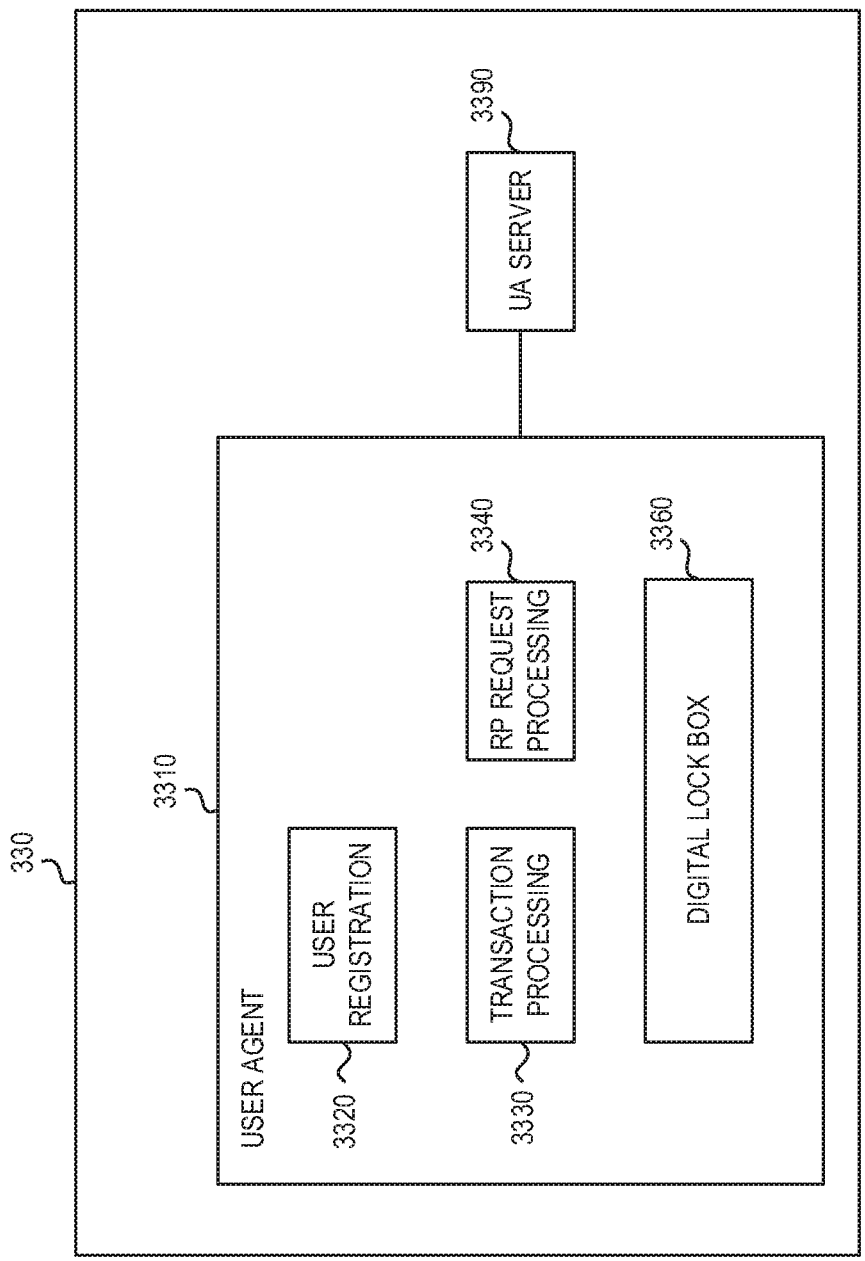
FIG. 4 is a simplified system block diagram of user device 330 of FIG. 3.

Referring now to FIG. 4, there is illustrated a simplified system block diagram of user device 330 of FIG. 3. User device 330 has a user agent 3310 executed by a processor of the user device, and which interfaces with a user agent server 3390 that also executes on user device 330. The end user interacts with system 300 via the user agent 3310, which provides graphical user interfaces for displaying output to the user via the user device 330, and accepts input from the user. User agent 3310 implements a variety of software modules, such as user registration module 3320 for managing the user registration and on-boarding process, transaction processing module 3330 for managing identity transactions and the collection of attested data items from attestation servers, In some cases, the syntax processing elements of transaction processing module 3330 may be a separate module (not shown). RP request processing module 3340 for managing RP requests for data bundles and obtaining consent from the user. User agent 3310 can also manage a digital lock box 3360, which may be a local or distributed data store that contains cryptographic key generation and derivation routines and data. It will be understood that functionality of the modules of user agent 3310 may be combined or further subdivided into different modules in some cases.

Digital lock box 3360 generally stores state information for user agent 3310, and profile information such as key derivation data, attested data items, ownership information, secret share data for data item decryption and so on, as described further herein. Digital lock box 3360 can also store digital content owned by the user, such as cryptographically signed documents. The content of digital lock box 3360 is cryptographically protected such that only the user agent 3310 can decrypt the information.

In some cases, some or all of the digital lock box 3360 can be implemented externally on a network server (e.g., support node 370) as part of a distributed database provided within system 300. The external digital lock box can be implemented in addition to a local digital lock box, or in lieu of some or all of the local digital lock box (this may occur, for example, where the digital lock box includes a data item that occupies more storage space than is available or practical on a user device 330). The distributed database may be composed of support node servers 370, or other servers. Additionally, use of the distributed database can facilitate recovery in the event of device loss or failure, synchronization if the user has multiple user devices 330, and to support some privacy requirements. Optionally, the entirety of a user's digital lock box 3360 can be implemented externally, including the recovery and data secrets and, in such cases, generally the digital lock box will be split into multiple components to prevent unauthorized decryption and use by third parties.

Storing a subset of digital lock box 3360 online provides service continuity capability for a user in the situation where their user device 330 data has become corrupted, lost or generally unavailable. Without this capability, the user would be required to re-register with each attestation server and obtain new data bundles.

Figure 5:
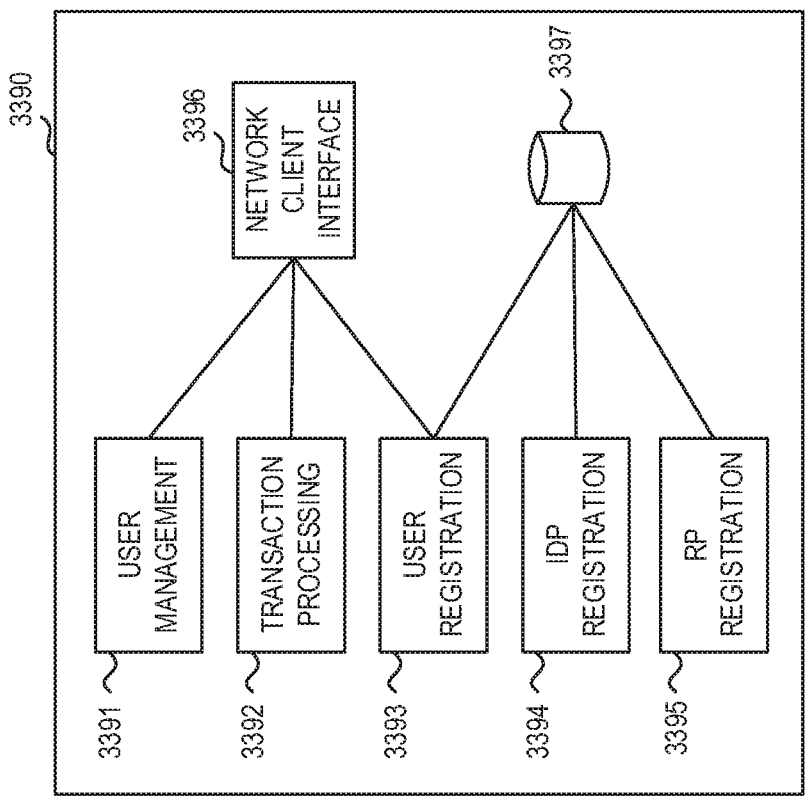
FIG. 5 is a detailed system block diagram of the user agent server 3390 of FIG. 4.

Referring now to FIG. 5, there is illustrated a detailed system block diagram of the user agent server 3390 of FIG. 4 and its interfaces. User agent server 3390 generally is the primary interface between user agent 3310 and any attestation server or RP server, or other network clients.

User agent server 3390 has a user management module 3391 for handling user registration functions, a transaction processing module 3392 for handling the exchange of attested data items, a RP request processing module 3393 for managing RP requests for attested data items, an attestation server registration module 3394 for handling registration with attestation servers, a RP registration module 3395 for handling registration with RP servers, a configuration database 3397 for storing parameters and data, and a network client interface 3396 for handling communication with other elements of system 300 outside the user device 330. It will be understood that functionality of the modules of user agent server 3390 may be combined or further subdivided into different modules in some cases. For example, a syntax processing element of transaction processing module 3392 may be provided as a separate module in some cases.

Generally, user management module 3391 may exchange data with a web browser or mobile application programming interface (API) executing on user device 330. Web browser user management may be used by a service administrator to authenticate into various elements of system 300. Similarly, transaction processing module 3392 may exchange data with a uniform resource locator (URL) processor. User registration module 3393 may exchange data with an authentication client (e.g., OAuth) or other API client executing on user device 330. Attestation server and RP registration modules 3394 and 3395 optional modules that may be used by a service administrator, for example, to register new attestation servers or RP servers. In some embodiments, interfaces may be implemented using the OpenID Connect authentication layer, or equivalent.

Configuration database 3397 can be used to store configuration parameters, such as the identification and network addresses of elements within system 300, such as attestation servers 350, RP servers 310, and related data.

Network client interface 3396 provides a collection of processes and libraries, for example with a RESTful web service API, that allows user agent server 3390 entities to exchange data with other elements of system 300. Generally, the processes and libraries of network client interface 3396 are abstracted, and leave specific application logic (e.g., banking website functions) to other elements of the system (e.g., mobile web browser). Network client interface 3396 can interface with other elements of system 300. Network client interface 3396 can also update a distributed database if it is used. For example, the distributed database can be distributed and replicated using Apache Cassandra™ or InterPlanetary File System (IPFS).

Accordingly, user agent server 3390 can act as a transaction processing hub, to orchestrate interactions for or with user agents, and to communicate with one or more elements of system 300 to complete requested tasks.

Figure 6:
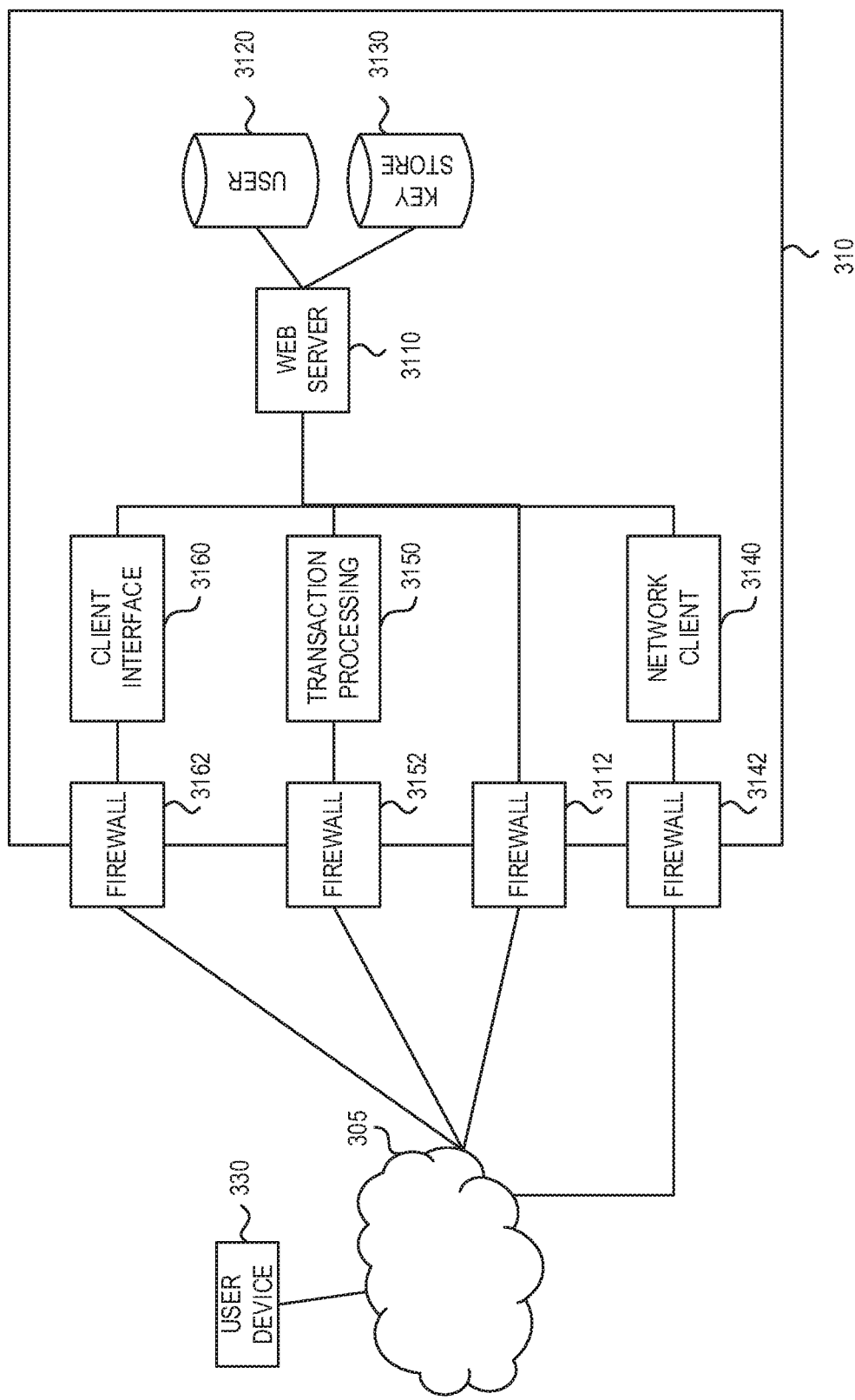
FIG. 6 is a detailed system block diagram of the RP server 310 of FIG. 3 and its interfaces to other elements of system 300.

Referring now to FIG. 6, there is illustrated a detailed system block diagram of the RP server 310 of FIG. 3 and its interfaces to other elements of system 300, in accordance with some example embodiments.

RP server 310 has a legacy web server 3110, which can continue to operate in known manner. Web server 3110 may have a user and application data store 3120, along with a cryptographic key store 3130. Generally, web server 3110 may serve requests for data according to known techniques, by exchanging data via a firewall 3112 and network 305. However, to interface with system 300, as when obtaining a data bundle from a user, RP server 310 has a client authentication interface module 3160, transaction processing module 3150, and a network client interface 3140. Client authentication interface module 3160 can connect to a user agent 3310 via a firewall 3162 and network 305. In some cases, user authentication can be performed out-of-band. Transaction processing module 3150 can connect to a user agent server via a firewall 3152 and network 305. Network client interface module 3140 can connect to a user agent server via a firewall 3142 and network 305.

In some cases, to obtain attested data items, RP server 310 can first authenticate the user device 330 user agent 3310, using one or more interfaces. In one example, RP server 310 can employ client interface 3160. As will be appreciated, various interfaces can be used, such as OAuth 2.0, OpenID Connect or Security Assertion Markup Language (SAML) form interfaces. Once authenticated, or in the case where authentication is not required, transaction processing module 3150 can request attested data items as described herein, by communicating with transaction processing module 3330 of user agent 3310. Transaction processing module 3330 may exchange data with transaction processing module 3392 of user agent server 3390.

Figure 7:
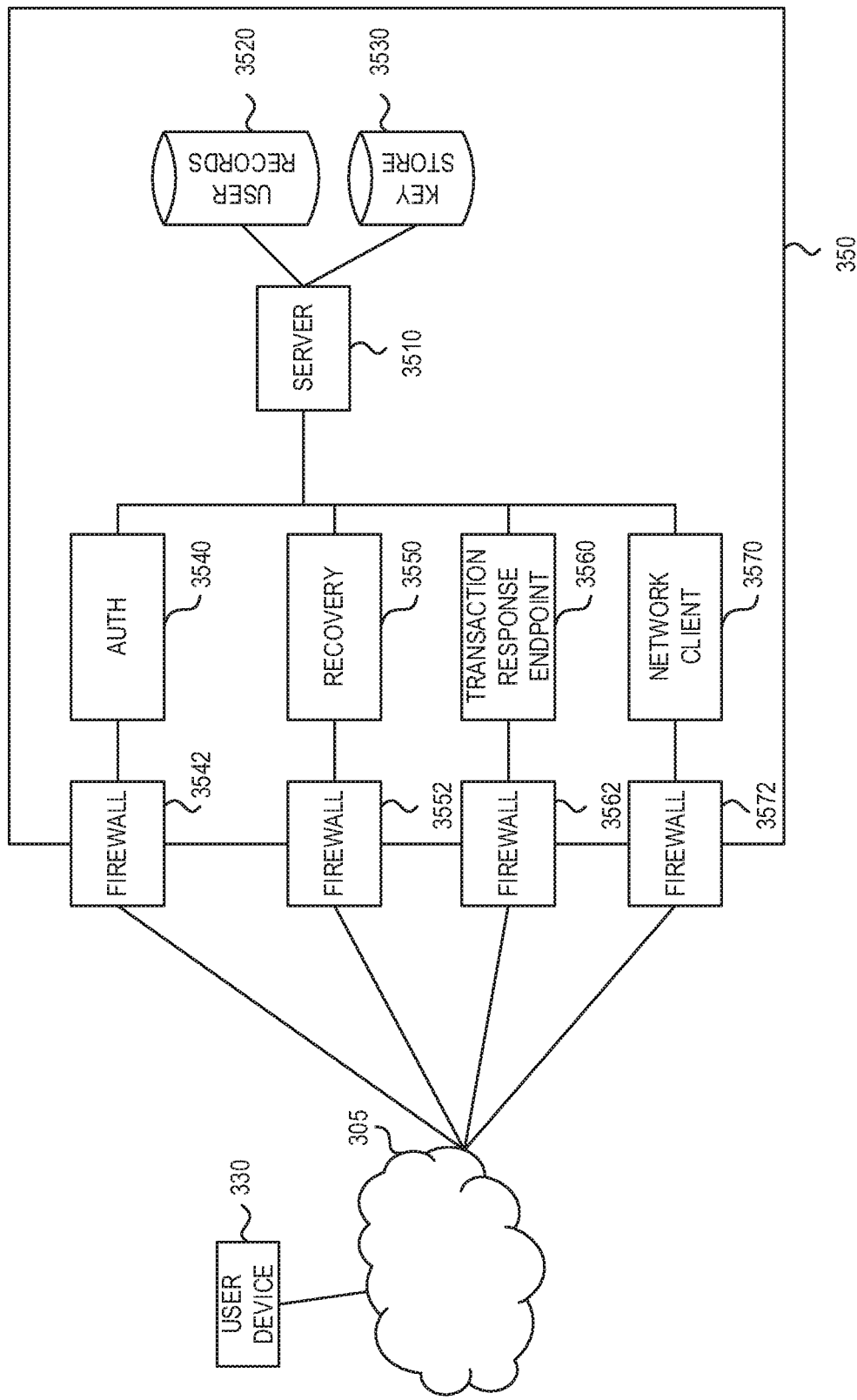
FIG. 7 is a detailed system block diagram of the attestation server 350 of FIG. 3 and its interfaces to other elements of system 300.

Referring now to FIG. 7, there is illustrated a detailed system block diagram of the attestation server 350 of FIG. 3 and its interfaces to other elements of system 300.

Attestation server 350 has a server 3510, which may be operated, for example, by a financial institution or government agency. Server 3510 may have a user record data store 3520, along with a cryptographic key store 3530. To interface with system 300, as when providing an attested data item to a user, attestation server 350 has an authentication interface module 3540 (e.g., which can perform out-of-band authentication in some cases), recovery module 3550, transaction response endpoint module 3560, and a network client interface 3570. Authentication interface module 3540 can connect to a user agent 3310 via a firewall 3542 and network 305. Recovery module 3550 can connect to a user agent server, for example using a REST protocol, via a firewall 3552 and network 305. Similarly, Transaction response endpoint module 3560 can connect to the user agent server, also using a REST protocol, via firewall 3562 and network 305. Network client interface module 3570 can connect to a user agent server via firewall 3572 and network 305. Although several modules and firewalls are shown, it will be appreciated that firewalls can be merged or further split or omitted altogether. Likewise, modules may also be merged, divided or omitted in some cases.

Server 3510 may provide core services to the user in known fashion. For example, if server 3510 is provided by a financial institution, server 3510 may provide some online banking services, or support such services. To interface with system 300, once a user agent 3310 is authorized, it may request and collect new attested data items from attestation server 350 via transaction response endpoint 3560. Transaction response endpoint 3560 can obtain the requested data items from user records store 3520, and generate the attested data items. The attested data items can be transmitted to user agent 3310 via network client interface 3570.

Processing a Relying Party Request

Figure 8:
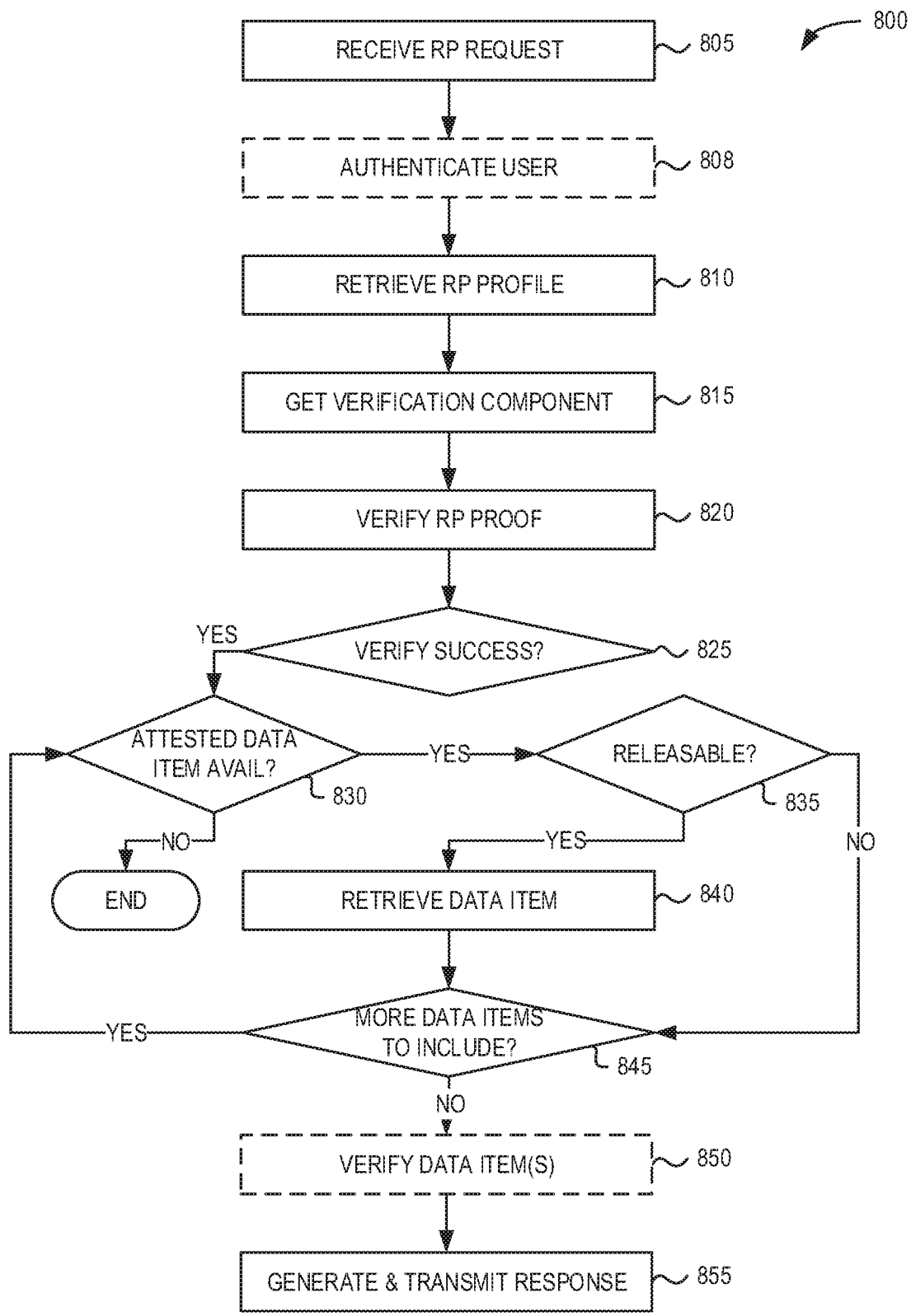
FIG. 8 is a process flow diagram for an example method of distributed data verification between a relying party server and a client device using data attested by at least one attestation server.

Referring now to FIG. 8, there is illustrated a process flow diagram for an example method of distributed data verification between a relying party server and a client device using data attested by at least one attestation server, in accordance with some embodiments.

Method 800 may be carried out, for example, by user agent server 3390 and user agent 3310 of a user device 330. In some cases, method 800 may be carried out by a remote server that interacts with the user device 330. In both cases, the user of user device 330 is identified and authenticated prior to method 800.

Method 800 begins at 805 with the user device receiving a relying party request (RP request) from a RP server, such as an RP server 310.

The RP request generally includes at least a relying party profile identifier (RP profile identifier) and an attested data item request. In addition, the RP request includes a relying party proof (RP proof) that enables verification of the relying party request by the user device 330. In some cases, the RP request may also contain a request for a non-attested data item, which can be any data provided by user agent server 3390 that need not be attested (e.g., timestamp, version data, non-critical identity data, nickname, etc.).

The RP request will have been generated by the RP server 310 in accordance with the methods described elsewhere herein. In at least some embodiments, the RP request will employ a syntax, which can be generated or parsed, or both, by RP servers 310, attestation servers 350 and user devices 330. In some cases, support nodes 370 may also generate or parse the syntax.

The RP request may also include extensible data, or an extensible data identifier, or both.

The RP profile identifier is an identifier that is used to uniquely identify each RP server 310 within system 300. For example, a uniform resource locator (URL), or globally unique identifier (GUID), or hash of a cryptographic public key that is the root of this entity's identity in the network. In some cases, the RP profile identifier may comprise several components (e.g., both URL and GUID). One example RP profile identifier is the tuple (https://example.com, 5A872C68-A163-42F6-A7E4-3198F136C48E), although many variations are possible.

The RP proof is computational proof that the RP request data is authentic. In some cases, asymmetric cryptography can be used to generate the RP proof, in which case it can be a signature made using a private key of the RP server 310. A RP public key can be associated with a RP profile identifier, and stored together at a support node 370 at the time of establishment.

In some alternative embodiments, a trusted third party can be provided in system 300, such as a support node 370, to store a shared secret, and to perform verifications that the originator of the RP request and RP proof is in possession of a shared secret. For example, RP server 310 may provide one or more support nodes 370 with a shared secret and, subsequently, each RP proof may be generated by mixing the shared secret with the RP request data, and generating a hash. The RP proof can therefore be the generated hash, which can be verified for user agent server 3390 by a support node 370.

In some cases, the RP request may contain a user authentication request, which may cause the user agent server 3390 challenge the user at 808—using user agent 3310 and user device 330—to provide an authentication credential registered to the user (e.g., verified against a credential stored at a support node 370). The credential may be, for example, a password, biometric, token, or some combination thereof as will be known. User device 330 may be used to provide the credentials.

In some cases, the authentication request may require that a real-time authentication be performed. In the case of a real-time authentication, the user agent server 3390 may require the user to authenticate to a trusted authentication provider service (e.g., a support node 370 or attestation server 350) within system 300. For example, the user may be required to prove possession of a device registered to their identity by a network operator or device issuer, or provide a photo to match a photo on file at an ID issuer, or the like.

When authentication has been completed successfully (or if it was not required), the user agent server 3390 can retrieve cryptographic keys associated with the user for further use. The authentication may also generate an authentication attested data item, for inclusion in a response to the RP request.

Once the RP request is received, it may be verified to ensure that the request originated from the expected RP server 310 at 810, 815 and 820. This verification guards against spoofing, man-in-the-middle attacks or replay attacks and provides assurance that the RP request is legitimate.

At 810, the user agent server 3390 may retrieve a relying party profile (RP profile) using the RP profile identifier. Generally, the RP profile is requested from a third party server or support node. For example, the RP profile identifier may be used to request the RP profile from a support node 370, or to query within a distributed database. In some alternative embodiments, however, the RP profile may be requested directly from the RP server 310.

The RP profile generally has several components: the unique RP profile identifier (as described above), one or more attested data items or identity attributes associated with the RP, attestations of the attested data items, a verification component, and service-specific data related to the RP server 310. Other data may also be included where desired.

A wide variety of RP profiles are possible, however for illustration the RP profile for an example financial institution is provided below encoded in JavaScript Object Notation (JSON) format:

```
"profile" : {
    "id" : "example-bank.com",
    "basic" : {
        "name" : "Example Dominion Bank Of Commerce",
        "address": "15 Main St., Anytown, Ontario, Canada, A0A 1K0",
        "telephone" : "+18005551212"
    },
    "telephone" : "+18005551213",
    "website" : "https://www.example-bank.com",
    "socialmedia" : "@example_bank",
    "keyid"   : "network/68qwetvc82ubc9ub9ed9uwb",
    "processing_agent" : [
    {
        "name": "canpay",
```

```
            "addr": "0bfce358abddd8da2c9d9132ec5e58ec5cc38b",
        },
        {
            "name" : "example_union",
            "addr" : "fabef8447c23b9607af84cef85ced638ea128",
        }
    ]
},
signatures: {
    "profile" : {
        "keyid" : "network",
        "sig" : "4552f8cafb437a746adee238db23a92183d94a6c0574e7081b8",
    },
    "basic" : {
        "keyid" : "example.gov",
        "sig" : "970b13c5dccf786be9c59a47722d81d8e170dbb443cb1a26"
    },
    "telephone" : {
        "keyid" : "ExampleTel",
        "sig" : "29c1904f032af5734bacb3dcf89b2992b820b6f9bd457532"
    },
    "website" : {
        "keyid" : "https://example-bank.com"
    },
    "socialmedia" : {
        "keyid" : "socialmedia_verifier",
        "sig" : "97ed154ebb7f9d8cab5dd6e66155c3a1cc8ae147f84328ef"
    }
}
```

As can be observed, the "signatures" element contains attestations provided by attestation servers, of one or more attested data items within the RP profile.

The above example RP profile may be rendered in a user agent 3310 as follows:

Profile ID: example-bank.com
Name: Example Dominion Bank of Commerce Inc.
Address: 15 Main St., Anytown, Ontario, Canada, A0A 1K0
Telephone: 1-800-555-1212
Website: https://www.example-bank.com
Social Media: @example_bank
Verified By:
Example Government Agency
ExampleTel (1-800-555-1212)
Domain Certificate (example-bank.com)
Social Media (@example_bank)
Public Key:
04cd5cb0f7d45a74d707f3ea44e6a1944d335b7c56b0e 30f41a685975d 9a79076a460f7597f423b2ba63f83053f3fb578be695 d7bb537b04dd321 ce16a3ac56fbc Services Data:

canpay:
0bfce358abddd8da2c9d9132ec5e58ec5cc38bc892f7 eefce630a9049ff8 9f74 example_union:
fabef8447c23b9607af84cef85ced638ea128d0e89639 a8326c89241085 e1837

Accordingly, the above RP profile could be used for a well known financial institution that wishes to provide confidence and demonstrate legitimacy to any entities in system 300. This public profile includes extensible data that for the services canpay and example_union. This extensible data can contain information for these services or the location that such information can be retrieved elsewhere within system 300.

However, any entity can act as a relying party and have its own RP profile. For example, an individual who wishes to collect money from other users for a charity run could have the following RP profile:

```
"profile" : {
    "id" : "john.doe",
    "basic" : {
        "name" : "John Doe",
        "address": "123 Main St., Toronto Ontario, Canada M3R 4T5",
    },
    "socialmedia" : "@john_doe",
    "keyid" : " network/bwyyc929ucby8b88yw",
    "processing_agent" : [
        {
            "name": "running_for_charity",
            "addr": "4718e9f6e9098cb1bbd3d6b3e4ab5c11b923f6033b70c",
        },
    ]
},
signatures: {
    "profile" : {
        "keyid" : "network",
        "sig" : "4552f8cafb437a746adee238db23a92183d94a6c0574e7081b8",
```

```
        },
    "basic" : {
        "keyid" : "example-bank.com",
        "sig" : "970b13c5dccf786be9c59a47722d81d8e170dbb443cb1a26b17"
    },
    "basic" : {
        "keyid" : "runningforcharity.org",
        "sig" : "f893edce73fecdc0e67a1b8a3655603436c4eb69061c165eb43"
    }
    "socialmedia" : {
        "keyid" : "socialmedia_verifier",
        "sig" "2f28ca9b0a74bbcc434184b7ea8bc2c01de95a74c0fde321f651a"
            }
}
```

This individual RP profile can in turn be rendered as follows:

Profile ID: john.doe
Name: John Doe
Address: 123 Main St., Toronto Ontario, Canada M3R 4T5
Social Media: @john_doe
Verified By:
Example Dominion Bank of Commerce (name, address)
Running for Charity (name, address)
Social Media Service (@john_doe)
Public Key:
04439e77b85a5b78b35c9f9d599f60f27502dd28c5d1b3acd5239fd3867
3e79aea20d7d0993036694e1494cfe3e54ac1ae125c 2978699037cd38 98e32a245e3d84
Services Data:
runningforcharity.org:
4718e9f6e9098cb1bbd3d6b3e4ab5c11b923f6033b70c Accordingly, the above individual's RP profile contains name address and social media identity attributes, along with services data for the charity "Running for Charity". The RP profile also contains attestations of name and address generated by "Example Dominion Bank of Commerce" and "Running for Charity" and an attestation of a social media account by "Social Media Service".

Although the above examples contains address information, some RP profiles can contain limited information to enhance privacy. For example, the following example RP profile contains only the cryptographic verification key, and information specific to the "canpay" service. This could be used, for example, by an entity that wishes to use system 300 for payment services, but does not wish to reveal personal data.

```
"profile" : {
    "id" : "FC11824B-5E1E-4F99-98F6-5120F08DF0C3",
    "keyid": " network/73afbq0dfab923",
    "processing_agent" : [
        {
            "name": "canpay",
            "addr": "58c0af57462c7561b4ae859235c2bff511ebd908f351bb87",
        },
    ]
},
signatures: {
    "profile" : {
        "keyid" : "network",
        "sig" : "52712329aa84384a837d8d1c96cbcdb4148d6c1bc49bb399",
            },
}
```

This RP profile would be rendered as follows:
Profile ID: FC11824B-5E1E-4F99-98F6-5120F08DF0C3
Verified By:
Public Key:
0403558e6f2ec2cd8471bec5bea3d75d271fb9ae1462b
  cd4f11dd05e57
  8b7355a5c873a13367c4653f985824efe4ea3ea8912
  445b1f8fae3c85f1f 6a6d640eda55
Service Data:
canpay:
  58c0af57462c7561b4ae859235c2bff511ebd908f3
  51bb87a0c7 4089d5cd54f1

As shown in the examples, the one or more attested data items can be identity claims the RP server 310 is willing to share with other entities in system 300, which can be used to add confidence as to the authenticity of RP server 310. For example, a contact telephone number may be provided, along with an attestation of the telephone number data item from the telecommunications company that provides telephone service to the operator of RP server 310.

The verification component is a public cryptographic key or a key identifier that can be used to retrieve a public cryptographic key, and which can be used to verify that any given RP request was generated by (or at least signed using a private cryptographic key) associated with RP server 310.

The service-specific data may be used for additional services specified in the RP request, beyond identification, as described further herein. This data need not be processed by user agent server 3390, but can be forwarded to other services.

At 815, the verification component is extracted from the RP profile. If the verification component is not a complete key, but is instead key derivation data, a partial key, a key identifier or key address, then the key itself can be generated using the partial key or derivation data, or retrieved using the identifier or address.

At 820, the RP proof is verified using the verification component or key obtained using the verification component. For example, a signature generated using a private key can be verified using the corresponding public key. Alternatively, a hash generated using a shared secret and be verified (e.g., by support node 370) using the shared secret and the request data.

At 825, the verification is evaluated and, if successful, method 800 proceeds to 830 to determine whether the attested data item request requested in the RP request can be fulfilled.

The attested data item request may define a plurality of attested data items that can be provided in response. Each discrete request for an attested data item can generally have several components: a scope, an assurance level and a requirement level. The scope can define a specific attribute identifier (e.g., surname, address, telephone, e-mail, etc.). In some cases, the scope can also define a policy that can be retrieved and which can provide a more exhaustive list of acceptable attribute identifiers. For example, a RP server 310 may reference a "government-issued identity document" policy, which can be stored by RP server 310, or at a support node 370. If the scope defines a policy, the user agent server 3390 may retrieve the referenced policy when determining whether the attested data item request can be fulfilled.

The assurance level can define levels of assurance that are required with the requested attested data item. For example, some levels of assurance may be "authoritative" (e.g., date of birth, as attested to by a government entity), "derivative" (e.g., age of majority, based on date of birth attested to by a government entity) or, in some cases, "self-asserted" (e.g., no attestation required).

As noted above, each RP request can request that multiple attested data items be returned. Depending on the scope specified in the RP request, user agent server 3390 may determine that attested data items from different sources (e.g., from unrelated attestation servers) can be combined in a single response to an RP request.

When multiple attested data items are requested, not all need be required to formulate a valid response. Accordingly, the requirement level can be used to indicate whether a particular attested data item is required in response to the RP request. The requirement level may also specify suitable substitutes for requested attested data items. For example, the RP request may contain attested data item requests for "driver's license photo" and "passport photo", but any one of the two is permitted in response.

At 830, the user agent server 3390 can evaluate the one or more attested data item requests in the RP request, and determine whether it can fulfill one or more of the requests, and in particular those that are required according to the requirement level specified.

User agent server 3390 can fulfill an attested data item request if a suitable attested data item is available in a local data store. In some cases, the suitable attested data item may not be available initially, in which case user agent server 3390 can retrieve it (e.g., in real-time) from a remote data store, or by transmitting a request for the attested data item or items from one or more attestation servers, which may be unrelated (e.g., because they are operated by different entities, have different cryptographic keys, etc.). The attestation servers may respond to the request by providing the additional attested data item or items and the corresponding attestations. When a suitable attested data item is available, the attested data item and a corresponding attestation are retrieved at 840. The attestation is a cryptographically-generated proof that the attested data item was verified by at least one attestation server.

At 835, user agent server 3390 may determine whether the attested data item is eligible to be released to RP server 310. For example, user agent server 3390 may request an authorization from a user of user device 330 to release each attested data item to RP server 310. For example, user agent server 3390 may interact with user agent 3310 and display a graphical prompt, requesting input from the user to authorize release of each attested data item. In some cases, this authorization may be pre-authorized by a user agent policy accessible to user agent server 3390, or the authorization may be omitted.

When the authorization is pre-authorized by a user agent policy, the user agent policy may specify that the attested data item, for example, can only be shared a predetermined number of times (e.g., once, twice, etc.), can only be shared for a predetermined period of time (e.g., for one day, until an expiry date, etc.), or until revoked by the user. Revocation can be carried out by the user updating the user agent policy—if the user agent policy is accessible to third parties (e.g., at a support node)—or else by the user agent server 3390 sending a revocation notification to the RP server or to a support node.

The user agent policy may also contain an access control list, to indicate the identities or categories of RP server to which release of the attest data item is pre-authorized.

At 845, the retrieval of attested data items and attestations can be repeated as necessary, if more than one attested data item is desired to be included in the response.

In some cases, user agent server 3390 may verify the attested data items at 850 prior to generating the response. This may occur, for example, where the attested data item was retrieved from a remote source, to verify that it has been unmodified since it was created. Verification can be performed by verifying the attestation associated with the attested data item, this can be done: 1) to ensure that the attested data item was issued to the user of user device 330; 2) to ensure that the attestation server which generated the attested data item allows release of the attested data item to the RP server 310, based on an access control policy; and 3) to ensure that the attested data item has not been tampered with, for example, where it has been retrieved from an untrusted data store.

At 855, user agent server 3390 generates a response payload containing the attested data items determined to be provided in response to the RP request, generates a response proof, such as a cryptographic signature of the response payload, or a hash of the response payload mixed with a shared secret. The response payload and the response proof form the response to the RP request; the response is then transmitted to the RP server 310 that sent the RP request.

Although method 800 is described with reference to a single RP server 310, user agent server 3390 can carry out method 800 in response to a RP request from a plurality of RP servers. Depending on the scope specified in the RP request, user agent server 3390 may respond to multiple RP servers 310 with similar or the same attested data items.

Figure 9:
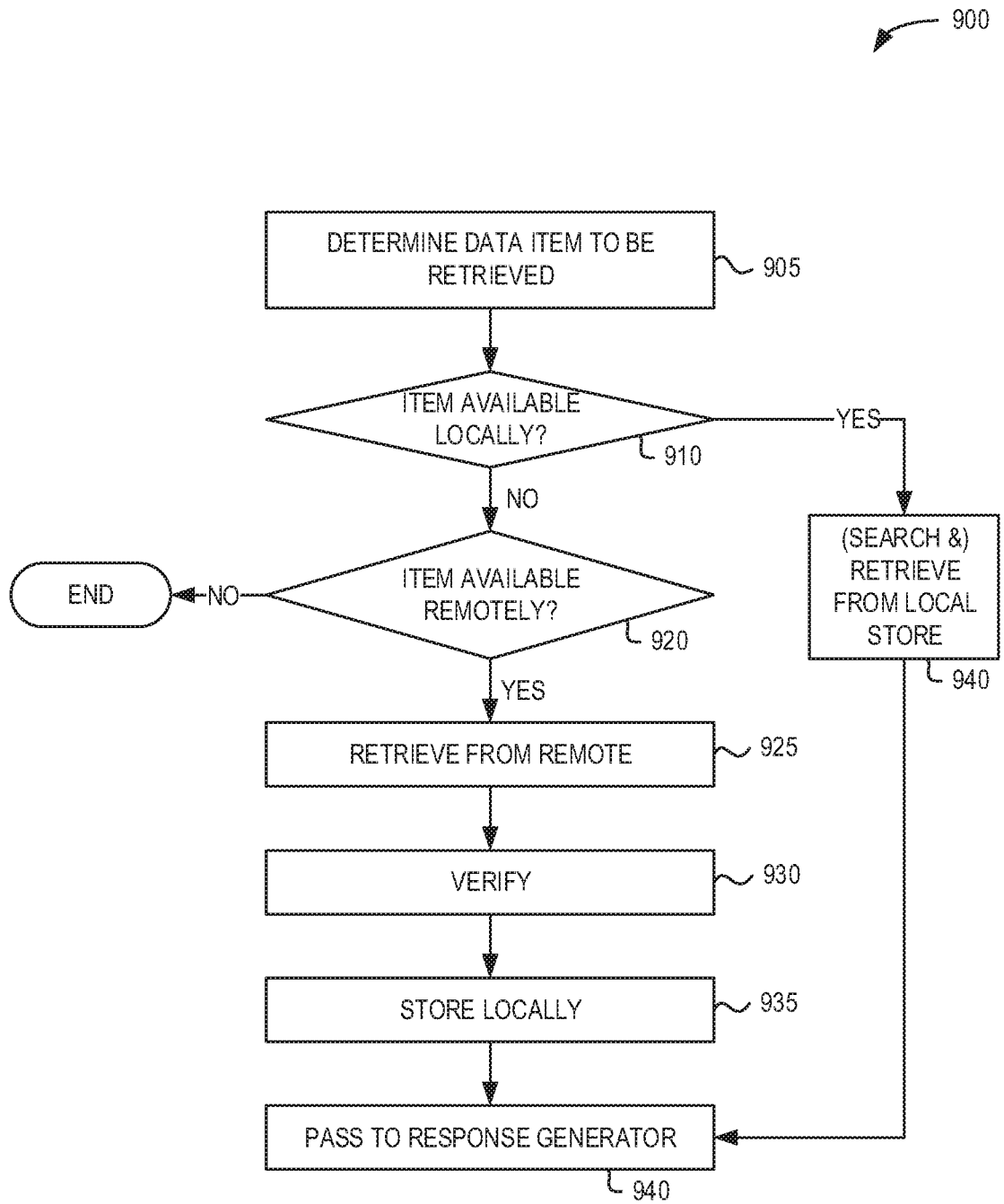
FIG. 9 is a process flow diagram for an example attested data item retrieval method for use with the method of FIG. 8.

Referring now to FIG. 9, there is shown in greater detail an attested data item retrieval method. Method 900 may be carried out, for example, at 840 of method 800 as described herein.

The attested data item to be retrieved is determined at 905 and, at 910, it is determined whether the attested data item is available in a local date store. If the attested data item is available in the local data store, it can be retrieved at 915 and the method may proceed to verification and response generation at 940.

If the attested data item is not available in the local data store, a determination is made at 920 whether the attested data item is available remotely at a support node 370, or else from an attestation server 350. For example, the determination may be performed by querying a distributed database hosted at support node 370, or connecting to an attestation server 350 to verify that it is online and available to provide a new attested data item.

If the attested data item is available remotely, it is retrieved along with a corresponding attestation using the appropriate procedure at 925. For example, if stored in a distributed database, the stored data is retrieved. Likewise, if the attested data item is a new attested data item, then the user agent server 3390 carries out the appropriate procedure to obtain a new attested data item.

To determine where an attested data item can be found, the user agent may access a locator service, such as a domain name system (DNS) or query endpoint, which can resolve a specific location in analogous fashion to the treatment of such queries on a content delivery network, in DNS or a load balancer.

At 930, the attested data item can be verified using the attestation. Verification can be performed for several reasons: 1) to ensure that the attested data item was issued to the user of user device 330; 2) to ensure that the attestation server which generated the attested data item allows release of the attested data item to the RP server 310, based on an access control policy; and 3) to ensure that the attested data item has not been tampered with, for example, where it has been retrieved from an untrusted data store.

Optionally, at 935, the attested data item and attestation are stored in a local data store, and the method proceeds to verification and response generation at 940, as described with reference to method 800.

In some embodiments, a RP request may contain one or more processing agent request. A processing agent is a third-party server (which may be a support node 370), that can perform transaction processing outside the capabilities of the RP server 310 or user device 330, or their interaction. For example, processing agents may exist to handle peer-to-peer payment, digital document signing, other services.

A processing agent server can be registered with system 300 using a unique processing agent identifier. Each processing agent server can have cryptographic keys for identification, and associated network endpoints for receiving or routing processing requests.

Processing agent servers may belong to one or more categories, or processing agent groups. Each group may be specified in a group policy stored in a support node 370 of system 300. For example, the group policy may define a unique group name, and identify qualified processing agent servers capable of providing the desired additional request data for that group. For example, a "canpay" processing agent group may include a list of Canadian financial institutions capable of processing payments.

Figure 10:
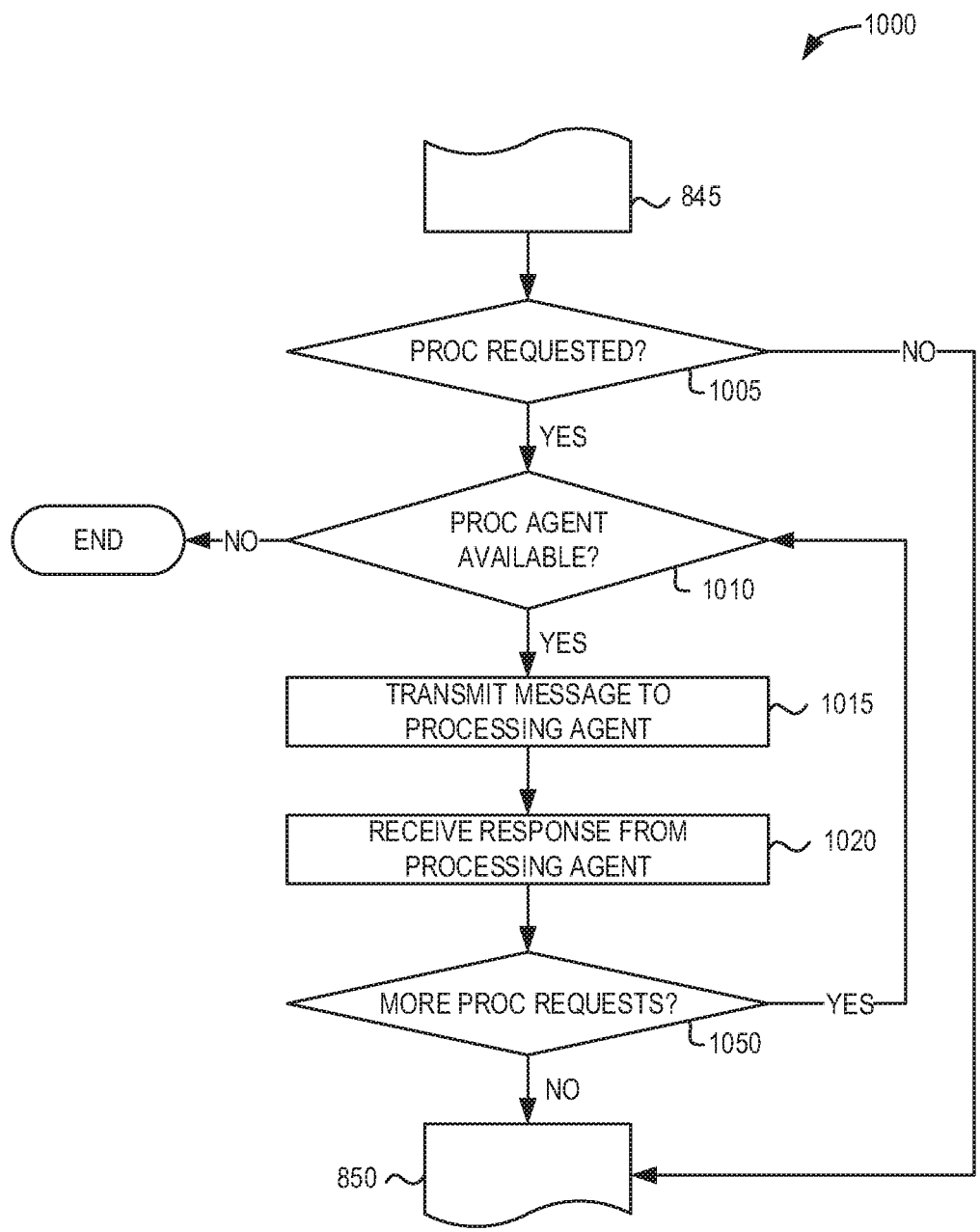
FIG. 10 is a process flow diagram for another example method of distributed data verification between a relying party server and a client device.

Referring now to FIG. 10, there is illustrated a process flow diagram for an example method of distributed data verification between a relying party server and a client device using data attested by at least one attestation server, in accordance with some embodiments. Method 1000 is generally analogous to method 800, with the exception that additional acts may be carried out when one or more processing agent request is included in the RP request.

Method 1000 therefore may begin after attested data items have been retrieved at 845 of method 800. At 1005, it is determined that a processing agent request is specified in the RP request. The processing agent request contains an indication of the processing agent or agents to which user agent server 3390 can forward attested data items for further processing. For example, the processing agent request may directly specify a processing agent identifier. In some cases, a processing agent group may be specified, in which case user agent server 3390 may choose a processing agent server belonging to the processing agent group—according to the relevant group policy—with which to interact further.

At 1010, user agent server 3390 determines whether interaction is possible with the chosen processing agent server. In some cases, this may include authentication or login with the processing agent server, which can cause user agent 3310 to prompt a user of user device 330 to provide authentication credentials.

If authentication, or the interaction more generally, is unsuccessful, user agent server 3390 may choose a different processing agent server if available, or else end the method due to inability to interact with an appropriate processing agent server.

If the interaction is successful, user agent server 3390 may generate a transaction request, which can contain attested data items and associated attestations from RP server 310 (e.g., RP profile as provided in the RP request) or from user agent server 3390, or both, along with an indication of the processing to be performed by the processing agent server.

The transaction request is transmitted to the processing agent server at 1015, which thereupon carries out the requested processing, and transmits a transaction response. The transaction response is received at 1020, and at 1050, user agent server 3390 may determine that additional processing agent requests are present in the RP request and return to 1010. If no further processing agent requests are present, the user agent server 3390 may proceed to 850 of method 800.

In some cases, two or more processing agent requests can be linked in the RP request, such that the output of a first processing agent request can be used as input to a second processing agent request. For example, the first processing agent request may use a first processing agent to verify the membership status of the user in an organization, subsequently the second processing agent can use the membership status output from the first processing agent to determine a payment to be made using the second processing agent.

Figure 11:
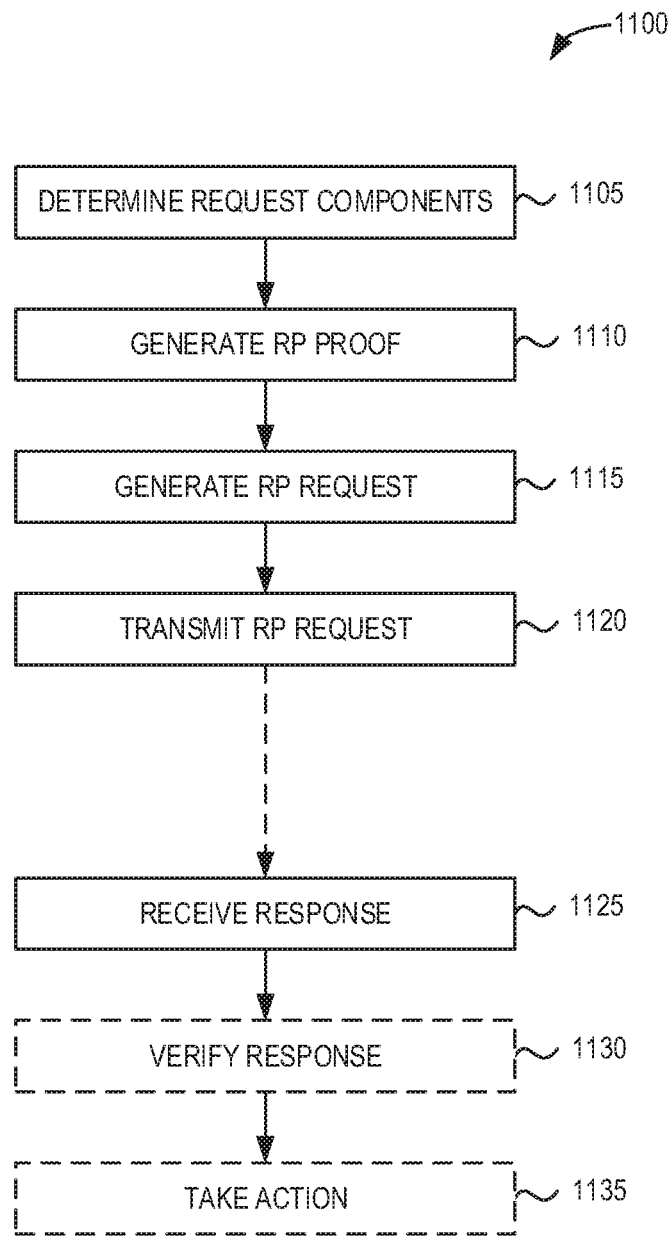
FIG. 11 is a process flow diagram for an example method of distributed data verification between a relying party server and a client device using data attested by at least one attestation server.

Referring now to FIG. 11, there is illustrated a process flow diagram for an example method of distributed data verification between a relying party server and a client device using data attested by at least one attestation server, in accordance with some embodiments.

Method 1100 may be carried out, for example, by RP server 310, and begins at 1105 with RP server 310 determining the request components to be included in an RP request.

As described herein, the RP request generally has a RP profile identifier and an attested data item request for one or more attested data items. The attested data items to be requested may be determined based on a service provided by RP server 310. For example, a RP server 310 that provides government voting may determine that an identification attribute is required from a user of user device 330 when interacting with RP server 310.

The RP request may also, in some cases, contain one or more attested data items associated with the RP server 310 itself.

In some cases, RP server 310 may determine one or more processing agent to be used by user agent server 3390 and the associated processing agent identifiers.

The RP request may also, in some cases, contain one or more policies or policy identifiers, for example a processing agent group policy or scope policy.

In some cases, the RP request may contain a non-attested data item request, as described elsewhere herein.

To facilitate flexibility and extensibility in the RP request, a common syntax can be used by the entities of system 300. The syntax can allow RP server 310 to generate a request phrase, such as the following:

This request originates from Relying Party R, here is the proof of origin, and my verifiable identity profile can be examined at this location. This request is for user U to perform the following transaction T through the processing agent S. In order to complete the transaction, the attested data items X are to be supplied by at least an authoritative source, the attested data items Y are to be supplied by at least a derivative source that met these proofing standards, and the attested data items Z can be self-asserted. The user must authenticate via method A against one of the identity sources in X. Once complete, return the result here, and execute the next statement in this request.

Accordingly, the syntax for a RP request may contain several elements $\{R, S, C, T, A, L, N\}$, where:

R → { $R_{id}$, $R_{proof}$, $R_{profile}$ }
$R_{id}$ → RP profile identifier: { GUID | URN | OID | location }
$R_{proof}$ → RP cryptographic signature
$R_{profile}$ → { RP identity profile data | GUID | location }
S → processing agent identifier: { GUID | URN | OID | location }
C → claim or attested data item request element: { $C_{scope}$, $C_{source}$, $C_{mandatory}$, D
}
$C_{scope}$ → attribute group identifier
$C_{assurance}$ → assurance level: { authoritative | derivative$_{1..n}$ | self-asserted | default }
$C_{mandatory}$ → { true | false }
D → {C | nil}
T → { transaction data | nil }
A → { realtime authentication | nil }
L → return location: location
N → next transaction: { Request | nil }
location → URL
GUID → globally unique identifier or index in a data store
URN → Uniform Resource Name
OID → Object Identifier
authoritative → resource must be an authority on the identity claim (ownership of account, etc...)
derivative$_{1..n}$ → a provider of an identity claim, obtained from another source.
1..n indicates the strength of the proofing process performed by this source.
self-asserted → an identity claim the user declared ownership of, but no other proof was performed.
default → a user's default, or preferred, claim source The syntax phrases may be encoded in any machine parseable format (whether binary, ASCII, or a mix thereof) and transferred from RP server 310 to a user agent server 3390 via system 300.

The syntax phrases may be encoded in several ways, such as in a URL request, in JavaScript Object Notation (JSON), or extensible markup language (XML).

For example, linked RP requests can be specified in HTTP URL format as:

https://example.com/id-rtv-service/relyingPartyID?
id=name,driverslicense
&rtv=facematch
&service_msg= . . .
&next=https://example.com/id/ . . .
&sig=xnijbfieu24974bfhibc9un29eucibayg28ybcinwu2

In this example, various elements of the RP request are passed as parameters and parameter values. For example, the RP proof is passed in the parameter "sig".

Alternatively, a single RP request can be encoded in JSON as:

{
    "broker"    : "processorID",
    "issuer"    : "relyingPartyID",
    "actions"   : "identity, rtv, service"
    "id_claims" : {
            "name" : { "source" : "provider" },
            "driverslicense" : { "source" : "authority", "required" : true }
    },
    "authenticate" : {
            "biometric" : "face"
    },
    "service_message" : {
            ...
    },
    "timestamp" : 2016-01-04T08:15:30-05:00,
    "signature" :
"4fbw8ybq8yvpqudn9q9uf9udnvuqnuhqeufnvqubr8y308r83828fbjdieg"
}

In this example, the attested data item request is encoded in "id_claims", and the assurance level and requirement level are passed as elements of "id_claims"

In another example, linked RP requests can be specified in XML as:

```
<Requests>
 <Request>
    <broker> processorhost </broker>
    <issuer> relyingParty </issuer>
    <timestamp format="iso8601"> 2016-01-04T08:15:30-05:00 </timestamp>
    <actions>
       <action> identity </action>
       <action> rtv </action>
    </actions>
    <claims>
      <claim source="provider"> name </claim>
      <claim source="authority" required="true"> driversLicense </claim>
    </claims>
    <realtimeAuths>
       <method type="biometric"> face </method>
    <realtimeAuths>
    <serviceMessage> ... </serviceMessage>
    <signature type="ECDSA">
3280rfh8uhvn8qc3ygncfcrfhq8mvq08nf0c8nqny8qcnefyv79628yogfquywgd
</signature>
 </Request>
 <Request>
    <broker> processorhost </broker>
    <issuer> relyingParty2 </issuer>
    <timestamp format="iso8601"> 2016-01-04T08:15:30-05:00 </timestamp>
    ...
 <signature type="ECDSA">
fwehrghvfbq0eybrgq0h3runqefuvqbqfbquefhvuqnvuqrv39vuqn </signature>
 </Request>
```

Various other encoding formats may be used to implement the syntax.

Given the extensibility and flexibility of system 300 and the syntax used to generate each RP request, RP servers can request a wide variety of data from user devices. Some examples of RP requests that can be generated in this way include, but are not limited to:

Can I have your name and current address?
Can I have the data from your driver's license?
Can I have your name, address, mobile number, whether you are over 18, and can you verify you are currently reachable at your mobile number?
Can I have your health insurance information, and can you verify that your face matches what is on the card?
Can you prove you can actually sign in to your registered online bank account, although the specific bank account is unimportant to me?
Can you prove your current name and address and then sign this document?
Can you prove you are this child's legal guardian, and sign this school permission form?
Can you provide your name, email address, mobile number, and then complete this payment transaction at your preferred online bank?
Can you provide your name and address and sign this release form?
Can you provide your name and health card number and email address so that I can send you your electronic health record?
Can you provide your private health insurance number so I can process this insurance claim?
Can you provide your driver's license, and prove you are the owner of the license by providing a picture of your face so that I will rent you this car?
Can you prove you are over 18 so you can play this online game?
Can you prove you have your plumber's certification and union membership so that you can work on this job site?
Can you prove you are a student at a college or university so that I can give you this student discount?

Referring still to FIG. 11, at 1110 the RP server 310 generates the RP request payload and generates the RP proof, for example by computing a cryptographic signature using a private key or shared secret. The RP proof and payload are then combined to generate the RP request at 1115.

At 1120, the RP request is transmitted to a user agent server 3390 (e.g., via user device 330) and, following processing by the user agent server 3390, a response is received at 1125.

In some variant embodiments, RP server 310 initially may not be communicating with a user agent server 3390. In such cases, RP server 310 may publish the RP profile on a server, such as a support node 370, or in the distributed database, or elsewhere. Such an RP profile may contain service information to enable another entity to carry out a transaction and generate a response to be received at 1125.

For example, a user may generate and publish a personal RP profile on a personal website for the purposes of raising funds for a charitable cause. The RP profile can contain a processing agent identifier that directs to a service for donating to the charitable cause, with the user's information. The processing agent identifier may itself be an attested data item, attested by an attestation server (e.g., operated by the charity receiving payment). Such an approach allows for ad-hoc interactions with one or more users, not necessarily in the context of a concurrent transaction.

Some actions involving a published RP profile can produce a trusted log, attested to by a processing agent or other attestation server, which can be used to demonstrate that the requested action was carried out. In some cases, attestation that the requested action was performed can itself be used to trigger a conditional action defined in a RP profile, which the RP server 310 will perform once the attestation of the requested action is received. Such interactions can be linked, such that a chain of actions is performed, even asynchronously.

Referring still to FIG. 11, RP server 310 can verify the attestations in the response at 1130 both to determine whether the attested data items in the response are authentic and also to determine whether the provided attested data items satisfy the scope, assurance level and requirement level that may have been used when generating the RP request (i.e., at 1115). For example, an attestation by "Example Bank" can be verified by retrieving the public key of Example Bank (e.g., from a support node 370 or directly from the attestation server) and verifying the cryptographic signature that constitutes the attestation, and then a policy may be checked to ensure that Example Bank meets the scope and assurance level specified in the RP request.

In some cases, an additional attestation provided by the user agent server 3390 for the response may be verified, in similar fashion.

When RP server 310 determines that the attestations are valid, the corresponding attested data items may be used for further processing at 1135 by RP server 310, for example, to provide a service requested by the user.

In general, the described embodiments provide for a system in which the system entities are loosely coupled, while still allowing for authentication data and transaction data to be tightly coupled in any given interaction. There need not be any prior relationships between relying parties and attestation servers. Moreover, there need not be any prior relationship between relying parties and users, prior to the interaction in which attested data items are requested and exchanged. Use of a common syntax enables a relying party to define what types of attested data items will be accepted for a particular transaction, without having to predetermine all possible sources of identification a user may wish to provide. That is, the relying party may not know the source of the attested data items a priori, but can nevertheless determine if they are satisfactory once they are received.

As noted, attested data items (e.g., user's identity claims) can be linked and tightly coupled to specific application or transaction requests. This is in contrast with conventional FIM/FAM models, in which "authorization service" and "identity providers" are independent of the service being provided by a server which can result in multiple round-trip request-response pairs, and which decouples trust from the transaction itself.

The described embodiments are also flexible enough to provide for real-time verification to be performed where necessary, but also for asynchronous transactions to be performed where desired. In conventional FIM/FAM models, a common question for relying parties is: "although the user was able to authenticate to a credential, how can I be sure I am dealing with the actual individual, and not a set of stolen credentials?" This is because conventional authentication systems are external to current FIM/FAM protocols. The described embodiments allow for authentication and identity to be tightly coupled to a transaction, to help guarantee the identity claims match the user interacting with the RP server.

The described embodiments can be integrated with many existing formats, protocols, and standards.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method of distributed data verification between a relying party server and a client device using data attested by at least one attestation server, the method comprising:
    receiving a relying party request from the relying party server, the relying party request comprising a relying party profile identifier, an attested data item request, and a relying party proof cryptographically generated using secret data associated with the relying party server to enable verification of the relying party request;
    verifying the relying party request based on the relying party proof, wherein the verifying of the relying party request comprises:
    retrieving a relying party profile based on the relying party profile identifier,
    extracting a verification component from the relying party profile;
    cryptographically verifying the relying party proof using the verification component;
    in response to the verifying of the relying party request being successful:
    determining whether an attested data item can fulfill the attested data item request;
    in response to determining that the attested data item request can be fulfilled, retrieving the attested data item and an attestation corresponding to the attested data item, wherein the attestation comprises a cryptographically-generated proof that the attested data item was verified by the at least one attestation server;
    generating a response, the response comprising the attested data item and the attestation; and
    transmitting the response to the relying party server.

2. The method of claim 1, wherein the response comprises at least one additional attested data item and at least one additional attestation corresponding to each at least one additional data item, the method further comprising, prior to generating the response:
    determining that the at least one additional attested data item can fulfill the attested data item request;
    retrieving the at least one additional attested data item and the at least one additional attestation.

3. The method of claim 2, further comprising:
    determining that the at least one additional attested data item is not initially available;
    transmitting a request for the at least one additional attested data item to the at least one attestation server;
    receiving a response to the request for the at least one additional attested data item from the at least one attestation server, the response to the request for the at least one additional attested data item comprising the at least one additional attested data item and the at least one additional attestation; and
    storing the at least one additional attested data item and the at least one additional attestation in a data store.

4. The method of claim 2, wherein the at least one attestation server comprises at least a first attestation server and a second attestation server, and wherein the attested data item is received from the first attestation server, and wherein the at least one additional attested data item is received from the second attestation server.

5. The method of claim 1, wherein the attestation further comprises a cryptographically-generated client proof that the attested data item was verified by the client device, and wherein the generating the response further comprises:
retrieving a client device cryptographic key; and
verifying the attested data item using the cryptographically-generated client proof.

6. The method of claim 1, further comprising, prior to generating the response, determining whether the attested data item is eligible to be released.

7. The method of claim 6, wherein the determining whether the attested data item is eligible to be released is based on a user agent policy.

8. The method of claim 1, wherein the determining whether the attested data item can fulfill the attested data item request comprises searching for the attested data item in a data store.

9. The method of claim 1, further comprising:
determining that the attested data item is not initially available;
transmitting a request for the attested data item to the at least one attestation server;
receiving a response to the request for the attested data item from the at least attestation server, the response to the request for the attested data item comprising the attested data item and the attestation; and
storing the attested data item and the attestation in a data store.

10. The method of claim 1, wherein the relying party request comprises a processing agent identifier, the method further comprising:
determining a processing agent associated with the processing agent identifier;
providing the response to the client device; and
providing an indication of the processing agent to the client device to enable the client device to forward the response to the processing agent.

11. The method of claim 1, wherein the relying party profile identifier identifies a network location of the relying party profile.

12. The method of claim 1, wherein the relying party request comprises an identity attribute associated with the relying party profile.

13. The method of claim 1, wherein the relying party request comprises an identity attribute verification value associated with the identity attribute associated with the relying party profile.

14. The method of claim 1, wherein the relying party request comprises a plurality of identity attributes and a plurality of identity attribute verification values associated respectively with the plurality of identity attributes.

15. The method of claim 1, wherein the relying party request comprises an extensible data identifier.

16. The method of claim 1, wherein the relying party request comprises an identification of at least one attestation server.

17. The method of claim 1, further comprising, prior to generating the response, authenticating a user of the client device.

18. The method of claim 17, wherein the authentication is performed via the client device.

19. The method of claim 17, wherein the authentication is performed via an authentication server.

20. The method of claim 1, further comprising:
receiving a second relying party request from a second relying party server;
verifying the second relying party request;
determining that the attested data item can fulfill the second relying party request;
retrieving the attested data item and the attestation corresponding to the attested data item;
generating a second response, the second response comprising the attested data item and the attestation; and
transmitting the second response to the second relying party server.

21. The method of claim 1, wherein the relying party request comprises a policy identifier, the method further comprising retrieving at least one policy based on the policy identifier, wherein the determining whether the attested data item can fulfill the attested data item request is based on the at least one policy.

22. The method of claim 1, wherein the relying party request further comprises a non-attested data item request, and wherein the response comprises a non-attested data item, the method further comprising generating the non-attested data item.

23. A non-transitory computer readable medium storing computer executable instructions which, when executed by a computer processor, cause the computer processor to carry out an operation of distributed data verification between a relying party server and a client device using data attested by at least one attestation server, the operation comprising:
receiving a relying party request from the relying party server, the relying party request comprising a relying party profile identifier, an attested data item request, and a relying party proof cryptographically generated using secret data associated with the relying party server to enable verification of the relying party request;
verifying the relying party request based on the relying party proof, wherein the verifying of the relying party request comprises:
retrieving a relying party profile based on the relying party profile identifier,
extracting a verification component from the relying party profile;
cryptographically verifying the relying party proof using the verification component;
in response to the verifying of the relying party request being successful:
determining whether an attested data item can fulfill the attested data item request;
in response to determining that the attested data item request can be fulfilled, retrieving the attested data item and an attestation corresponding to the attested data item, wherein the attestation comprises a cryptographically-generated proof that the attested data item was verified by the at least one attestation server;
generating a response, the response comprising the attested data item and the attestation; and
transmitting the response to the relying party server.

24. The non-transitory computer readable medium of claim 23, wherein the response comprises at least one additional attested data item and at least one additional attestation corresponding to each at least one additional data item, the operation further comprising, prior to generating the response:
determining that the at least one additional attested data item can fulfill the attested data item request;
retrieving the at least one additional attested data item and the at least one additional attestation.

25. The non-transitory computer readable medium of claim 24, the operation further comprising:
determining that the at least one additional attested data item is not initially available;

transmitting a request for the at least one additional attested data item to the at least one attestation server;

receiving a response to the request for the at least one additional attested data item from the at least one attestation server, the response to the request for the at least one additional attested data item comprising the at least one additional attested data item and the at least one additional attestation; and storing the at least one additional attested data item and the at least one additional attestation in a data store.

26. The non-transitory computer readable medium of claim 24, wherein the at least one attestation server comprises at least a first attestation server and a second attestation server, and wherein the attested data item is received from the first attestation server, and wherein the at least one additional attested data item is received from the second attestation server.

27. The non-transitory computer readable medium of claim 23, wherein the attestation further comprises a cryptographically-generated client proof that the attested data item was verified by the client device, and wherein the generating the response further comprises:

retrieving a client device cryptographic key; and verifying the attested data item using the cryptographically-generated client proof.

28. The non-transitory computer readable medium of claim 23, the operation further comprising, prior to generating the response, determining whether the attested data item is eligible to be released.

29. The non-transitory computer readable medium of claim 28, wherein the determining whether the attested data item is eligible to be released is based on a user agent policy.

30. The non-transitory computer readable medium of claim 23, wherein the determining whether the attested data item can fulfill the attested data item request comprises searching for the attested data item in a data store.

31. The non-transitory computer readable medium of claim 23, the operation further comprising:

determining that the attested data item is not initially available;

transmitting a request for the attested data item to the at least one attestation server;

receiving a response to the request for the attested data item from the at least attestation server, the response to the request for the attested data item comprising the attested data item and the attestation; and storing the attested data item and the attestation in a data store.

32. The non-transitory computer readable medium of claim 23, wherein the relying party request comprises a processing agent identifier, the operation further comprising:

determining a processing agent associated with the processing agent identifier;

providing the response to the client device; and providing an indication of the processing agent to the client device to enable the client device to forward the response to the processing agent.

33. The non-transitory computer readable medium of claim 23, wherein the relying party profile identifier identifies a network location of the relying party profile.

34. The non-transitory computer readable medium of claim 23, wherein the relying party request comprises an identity attribute associated with the relying party profile.

35. The non-transitory computer readable medium of claim 23, wherein the relying party request comprises an identity attribute verification value associated with the identity attribute associated with the relying party profile.

36. The non-transitory computer readable medium of claim 23, wherein the relying party request comprises a plurality of identity attributes and a plurality of identity attribute verification values associated respectively with the plurality of identity attributes.

37. The non-transitory computer readable medium of claim 23, wherein the relying party request comprises an extensible data identifier.

38. The non-transitory computer readable medium of claim 23, wherein the relying party request comprises an identification of at least one attestation server.

39. The non-transitory computer readable medium of claim 23, the operation further comprising, prior to generating the response, authenticating a user of the client device.

40. The non-transitory computer readable medium of claim 39, wherein the authentication is performed via the client device.

41. The non-transitory computer readable medium of claim 39, wherein the authentication is performed via an authentication server.

42. The non-transitory computer readable medium of claim 23, the operation further comprising:

receiving a second relying party request from a second relying party server;

verifying the second relying party request;

determining that the attested data item can fulfill the second relying party request;

retrieving the attested data item and the attestation corresponding to the attested data item;

generating a second response, the second response comprising the attested data item and the attestation; and transmitting the second response to the second relying party server.

43. The non-transitory computer readable medium of claim 23, wherein the relying party request comprises a policy identifier, the operation further comprising retrieving at least one policy based on the policy identifier, wherein the determining whether the attested data item can fulfill the attested data item request is based on the at least one policy.

44. The non-transitory computer readable medium of claim 23, wherein the relying party request further comprises a non-attested data item request, and wherein the response comprises a non-attested data item, the operation further comprising generating the non-attested data item.

* * * * *